United States Patent
Sakurada et al.

(10) Patent No.: US 11,397,053 B2
(45) Date of Patent: Jul. 26, 2022

(54) HEAT EXCHANGER

(71) Applicant: DENSO CORPORATION, Kariya (JP)

(72) Inventors: Takashi Sakurada, Kariya (JP); Shota Terachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/799,268

(22) Filed: Feb. 24, 2020

(65) Prior Publication Data

US 2020/0191491 A1    Jun. 18, 2020

Related U.S. Application Data

(63) Continuation of application No. PCT/JP2018/032236, filed on Aug. 30, 2018.

(30) Foreign Application Priority Data

Aug. 31, 2017 (JP) .............................. JP2017-167567

(51) Int. Cl.
*F28D 9/00* (2006.01)
*F28F 9/00* (2006.01)
*F28F 9/02* (2006.01)

(52) U.S. Cl.
CPC ............ *F28D 9/0037* (2013.01); *F28F 9/001* (2013.01); *F28F 9/0226* (2013.01)

(58) Field of Classification Search
CPC ........ F25F 9/001; F25F 9/0226; F28D 9/0037
See application file for complete search history.

(56) References Cited

U.S. PATENT DOCUMENTS

| 2003/0217838 A1 | 11/2003 | Dey et al. |
| 2011/0168366 A1 | 7/2011 | Garret et al. |
| 2013/0133869 A1 | 5/2013 | Kinder et al. |

(Continued)

FOREIGN PATENT DOCUMENTS

| EP | 2795221 A1 | 10/2014 |
| FR | 2855604 A1 | 12/2004 |

(Continued)

OTHER PUBLICATIONS

Nozomi, Intake device of engine, 2012, Full Document (Year: 2012).*
Asano, Heat Exchanger, 2017, Full Document (Year: 2017).*

*Primary Examiner* — Elizabeth J Martin
(74) *Attorney, Agent, or Firm* — Harness, Dickey & Pierce, P.L.C.

(57) ABSTRACT

A heat exchanger includes a heat exchanger core, an intake tank, and a flow limiting portion. The heat exchanger core includes a stacked heat exchange portion, a distribution portion, and a collection portion. The stacked heat exchange portion defines first fluid flow paths through which a first fluid flows in a first direction, and second fluid flow paths through which a second fluid flows in a third direction. The distribution portion is configured to distribute the first fluid to the first fluid flow paths. The collection portion is configured to collect the first fluid from the first fluid flow paths. The flow limiting portion is configured to suppress an inflow of the second fluid from the intake tank into the distribution portion and the collection portion. The flow limiting portion and the intake tank are provided as a single component.

3 Claims, 17 Drawing Sheets

(56) References Cited

U.S. PATENT DOCUMENTS

2013/0192803 A1* 8/2013 Garret .................. F28F 9/0226
                                                              165/151
2018/0023898 A1   1/2018 Saitou et al.
2019/0346211 A1* 11/2019 Asano ...................... F28F 9/04

FOREIGN PATENT DOCUMENTS

| FR | 2977308 A1 | | 1/2013 |
|----|------------|---|--------|
| JP | 2011117715 A | | 6/2011 |
| JP | 2011525611 A | | 9/2011 |
| JP | 2013147954 A | * | 8/2013 |
| JP | 2017020652 A | * | 1/2017 |
| WO | WO-2016140203 A1 | | 9/2016 |

* cited by examiner

HEAT EXCHANGER

CROSS REFERENCE TO RELATED APPLICATION

The present application is a continuation application of International Patent Application No. PCT/JP2018/032236 filed on Aug. 30, 2018, which designated the U.S. and claims the benefit of priority from Japanese Patent Application No. 2017-167567 filed on Aug. 31, 2017. The entire disclosures of all of the above applications are incorporated herein by reference.

TECHNICAL FIELD

The present disclosure relates to a heat exchanger.

BACKGROUND

Conventionally, a kind of heat exchangers includes a heat exchanger core defining a cooling water flow path, and an intake tank connected to an opening on an inlet side of the heat exchanger core. In the heat exchanger core, multiple flow path forming portions each of which defines therein a cooling water flow path are stacked with each other in a predetermined direction. An air flow path is defined between each adjacent two flow path forming portions. The air flow path is a flow path through which a supercharged air flowing out of an intake tank flows. The heat exchanger core cools the supercharged air by exchanging heat between the cooling water flowing through the cooling water flow path and the supercharged air flowing through the air flow path.

SUMMARY

According to an aspect of the present disclosure, a heat exchanger includes a heat exchanger core and an intake tank. The heat exchanger core includes a stacked heat exchange portion, a distribution portion, and a collection portion. The stacked heat exchange portion defines therein: first fluid flow paths through which a first fluid flows in a first direction, the first fluid flow paths being aligned in a second direction intersecting with the first direction; and second fluid flow paths through which the second fluid flows in a third direction intersecting with the first direction and the second direction, each of the second fluid flow paths being defined between adjacent two first fluid flow paths of the first fluid flow paths. The intake tank has an inlet through which the second fluid flows therein and is configured to guide the second fluid toward inlet of the second fluid flow paths of the heat exchanger core. The heat exchanger includes a flow limiting portion configured to suppress an inflow of the second fluid from the intake tank into the distribution portion and the collection portion. The flow limiting portion and the intake tank are provided as a single component.

EMBODIMENTS

Comparative Example

Figure 1:
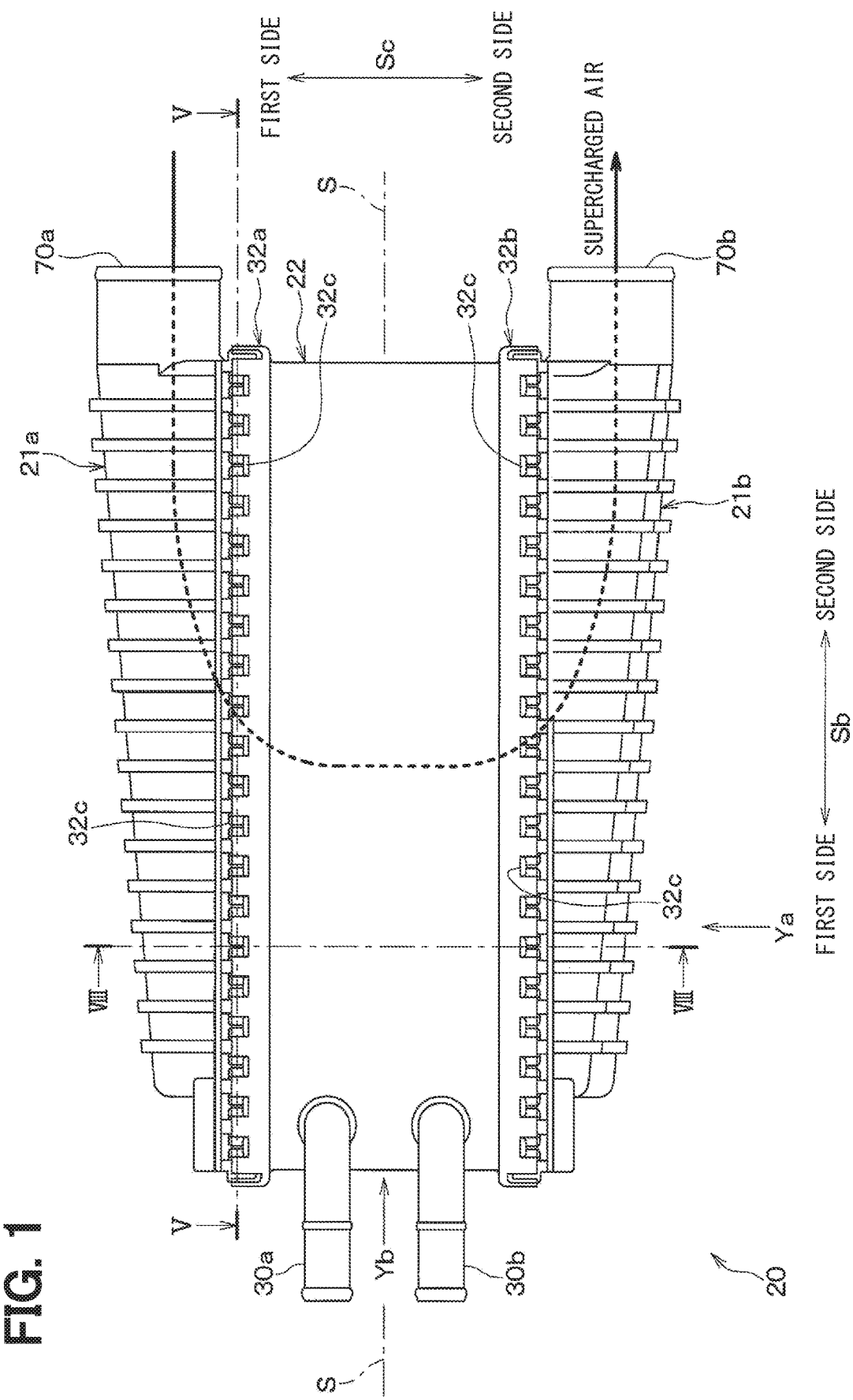
FIG. 1 is a top view illustrating an intercooler according to at least one embodiment.

A heat exchanger of a comparative example includes a cup portion on one side of the flow path forming portions. The cup portion is configured to distribute the cooling water flowing through a cooling water inflow nozzle into the flow path forming portions, and collect the cooling water from the flow path forming portions. The air flow path is not defined in the cup portion. Accordingly, the heat is not exchanged between the cooling water and the supercharged air in the cup portion.

A crimping plate (that is, a manifold) for fixing the intake tank to the heat exchanger core is provided to limit the supercharged air in the intake tank from flowing into the cup portion. According to this, a decrease of cooling performance of the cooling water for cooling the supercharged air in the heat exchanger core is suppressed.

In the heat exchanger of the comparative example, a wall portion is provided for limiting the supercharged air from flowing into the cup portion in which the heat exchange is not performed. Accordingly, the cooling performance of the heat exchanger core may be improved. However, the inventors have found that the number of components may increase since the wall portion is required in addition to the intake tank and the heat exchanger core.

Hereinafter, embodiments of the present disclosure will be described with reference to the drawings. In the following embodiments, the same or equivalent parts are denoted by the same reference numerals as each other, and explanations will be provided to the same reference numerals for simplifying descriptions.

First Embodiment

A first embodiment of the present disclosure will be described with reference to the drawings. In the present embodiment, an example in which an intercooler 20 shown in FIGS. 1, 2 is applied to a supercharged air cooling system 1 (refer to FIG. 3) for a vehicle will be described.

A supercharger 15 for supercharging intake air to an engine 10 (internal combustion engine) is provided in an intake air system of the engine 10 of a vehicle. The supercharger 15 is provided to compensate for the maximum output of the engine 10. That is, the vehicle of the present embodiment has the engine 10 made smaller for higher fuel efficiency and the supercharger 15 is used to compensate for the maximum output reduced in exchange for making the engine 10 smaller.

The intercooler 20 cooling intake air of the engine 10 is located downstream of the supercharger 15 in the intake air system in a flow of the intake air. The intercooler 20 cools the supercharged air that has been compressed by the supercharger 15 and supplies the supercharged air to the engine 10 so as to improve a charging efficiency of the intake air to the engine 10.

Figure 2:
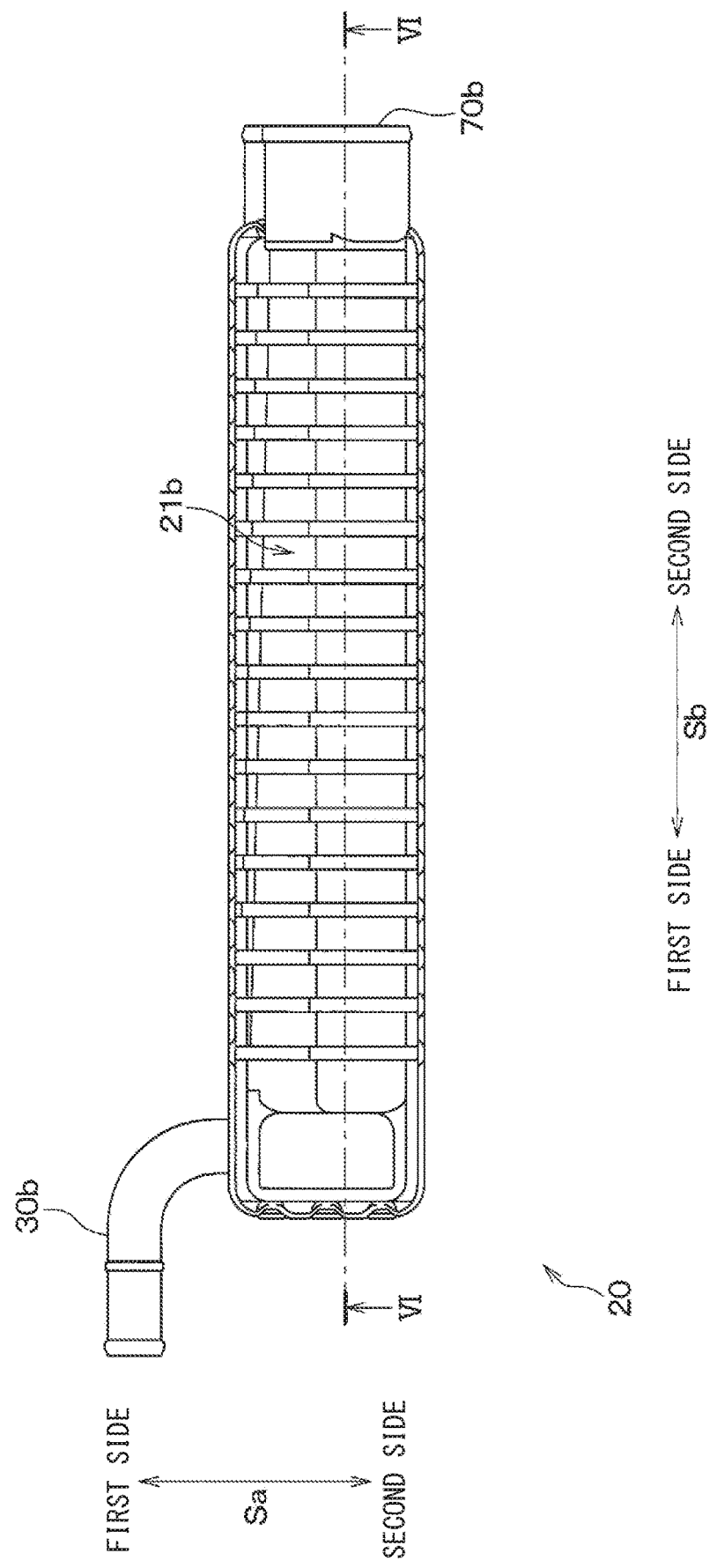
FIG. 2 is a side view illustrating the intercooler of at least one embodiment viewed along an arrow Ya of FIG. 1.
Figure 3:
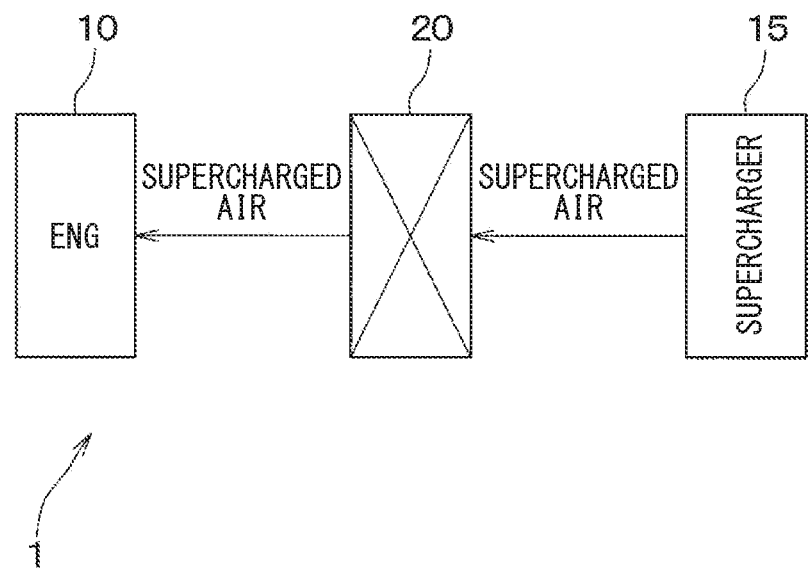
FIG. 3 is a block diagram illustrating an intake air system of a supercharged air cooling system according to at least one embodiment.
Figure 4:
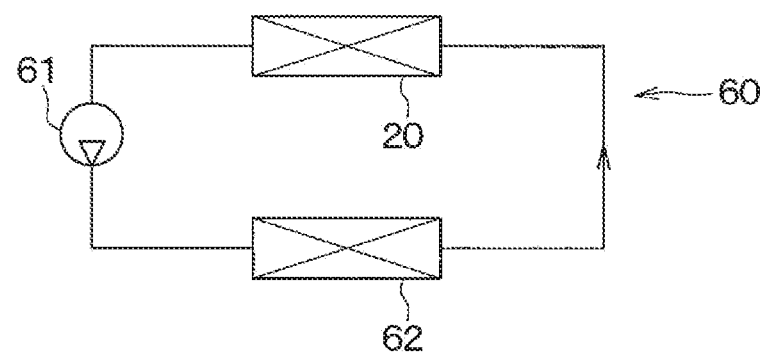
FIG. 4 is a block diagram illustrating a cooling water circuit of the supercharged air cooling system according to at least one embodiment.
Figure 5:
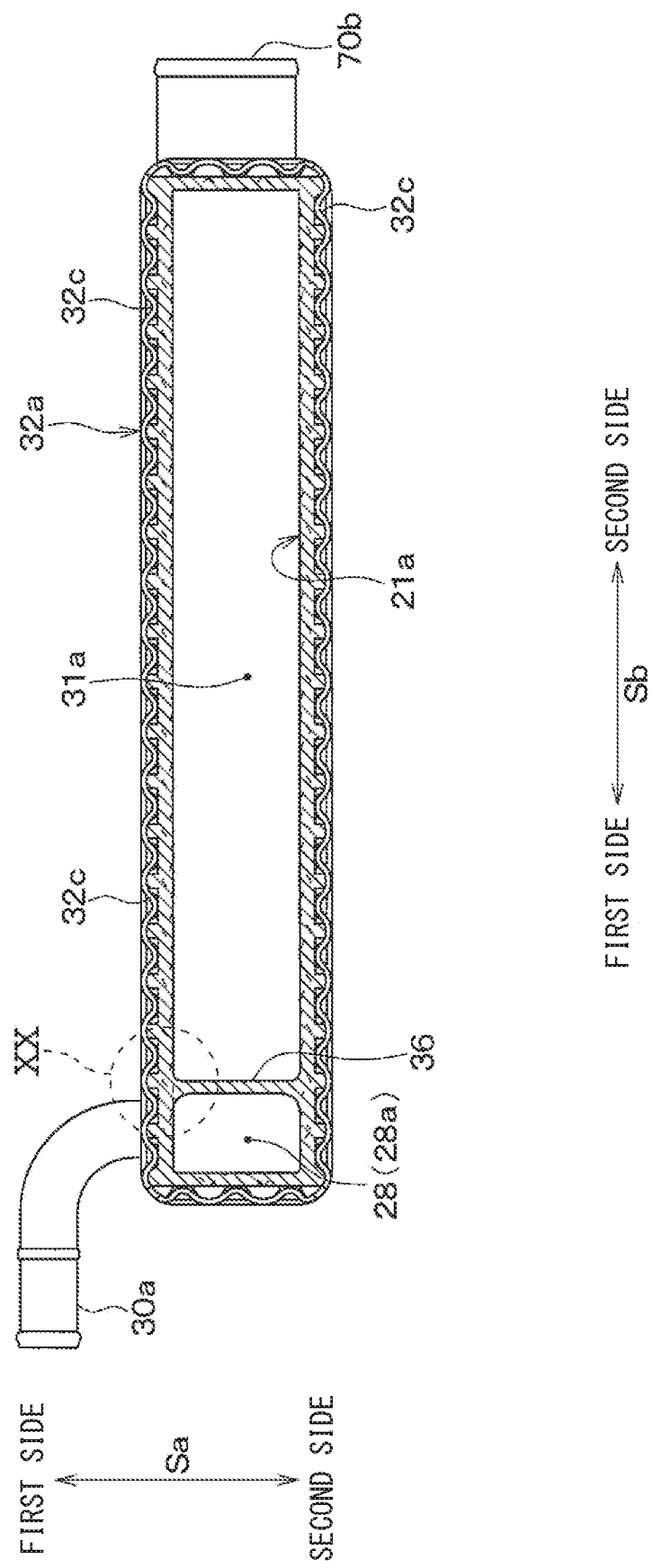
FIG. 5 is a cross-sectional view taken along V-V line in FIG. 1.
Figure 6:
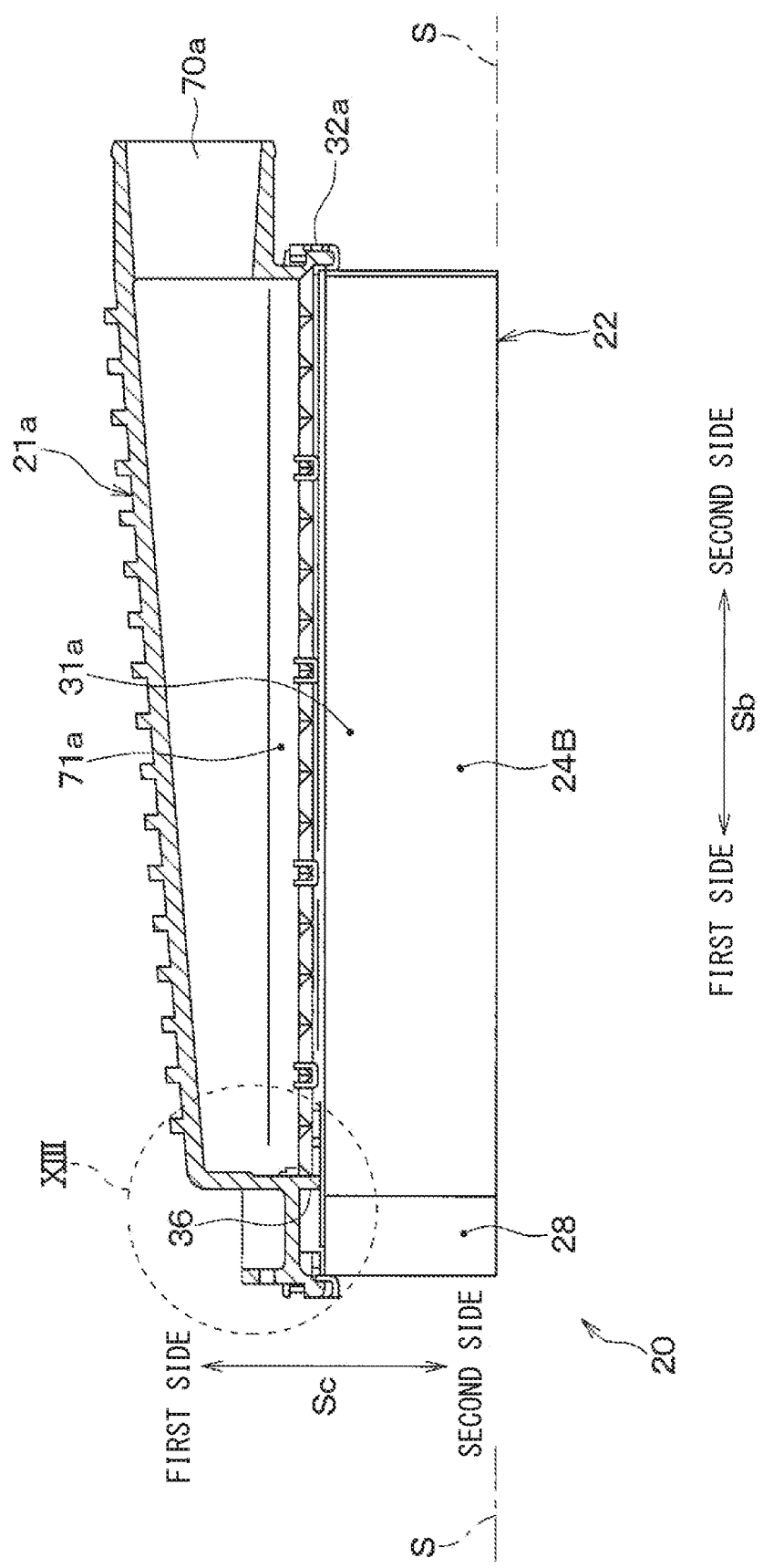
FIG. 6 is a cross-sectional diagram taken along VI-VI line in FIG. 2 and illustrating a half part of the intercooler located on one side in a supercharged air flow direction Sc.
Figure 7:
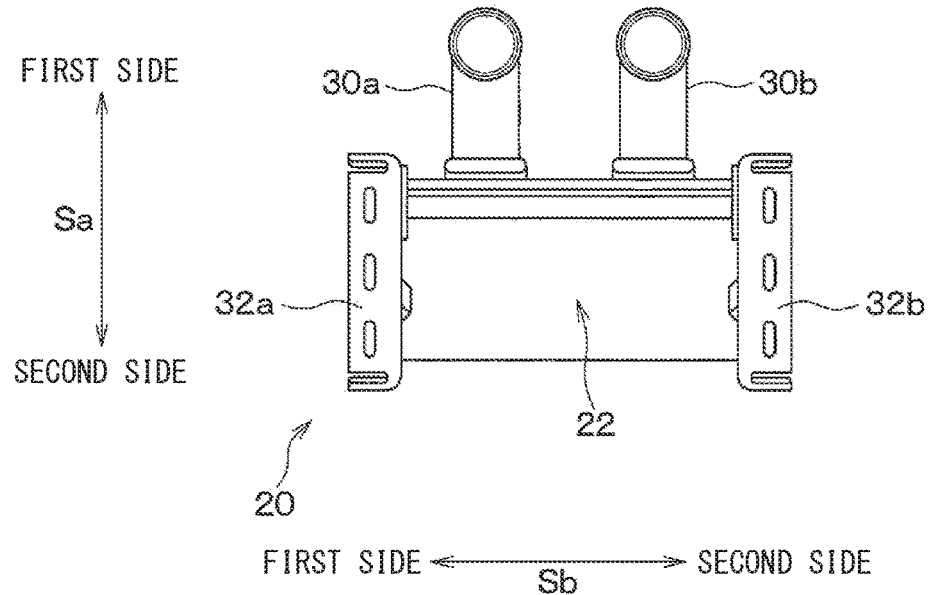
FIG. 7 is a diagram illustrating the intercooler viewed along an arrow Yb of FIG. 1, in which an intake tank and a discharge tank are omitted.

A cooling water circulating in a coolant water circuit 60 (refer to FIG. 4) flows through the inside of the intercooler 20 shown in FIGS. 1, 2. The intercooler 20 cools the supercharged air by exchanging heat between cooling water and the supercharged air compressed by the supercharger 15. A water pump 61 that causes the cooling water to circulate and a radiator that cools the cooling water by releasing heat of the cooling water to outside air are disposed in the cooling water circuit 60.

The intercooler 20, the water pump 61, and the radiator 62 are arranged in series with each other in the cooling water circuit 60. The cooling water is a heat medium for transporting heat and may be LLC (antifreeze mixture), water, or the like. The water pump 61 of the present embodiment is driven by driving force output from the engine 10.

Next, the structure of the intercooler 20 of the present embodiment will be described in detail with reference to FIGS. 1, 2, and 5 to 17.

The intercooler 20 of the present embodiment includes an intake tank 21a, a discharge tank 21b, and a heat exchanger core 22 as shown in FIGS. 1, 2, and 5 to 8. The heat exchanger core 22 is so-called drawn-cup heat exchanger.

Figure 8:
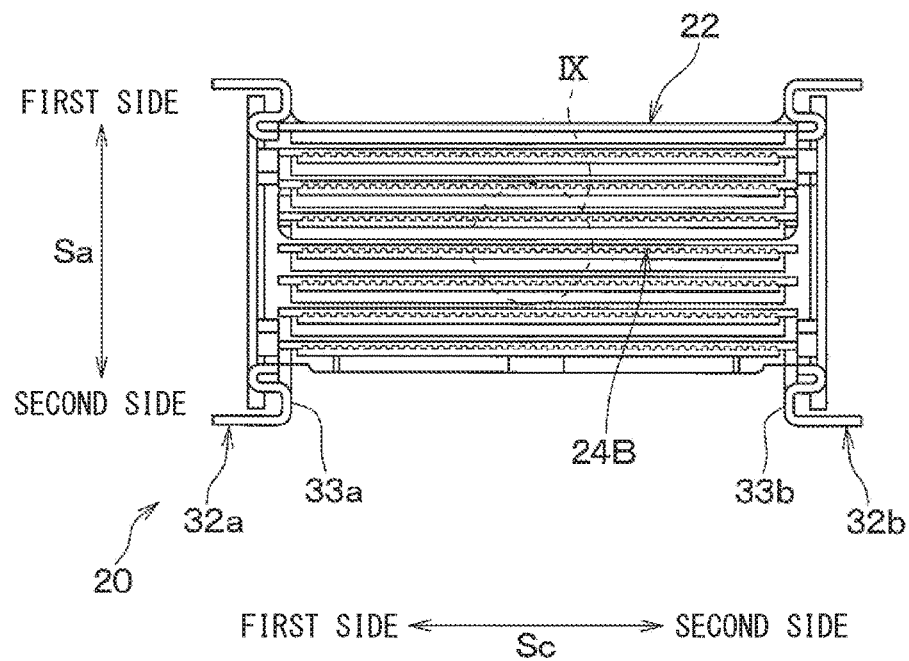
FIG. 8 is a diagram illustrating the intercooler viewed along the arrow Yb of FIG. 1 before two frames are crimped, in which the intake tank and the discharge tank are omitted.
Figure 9:
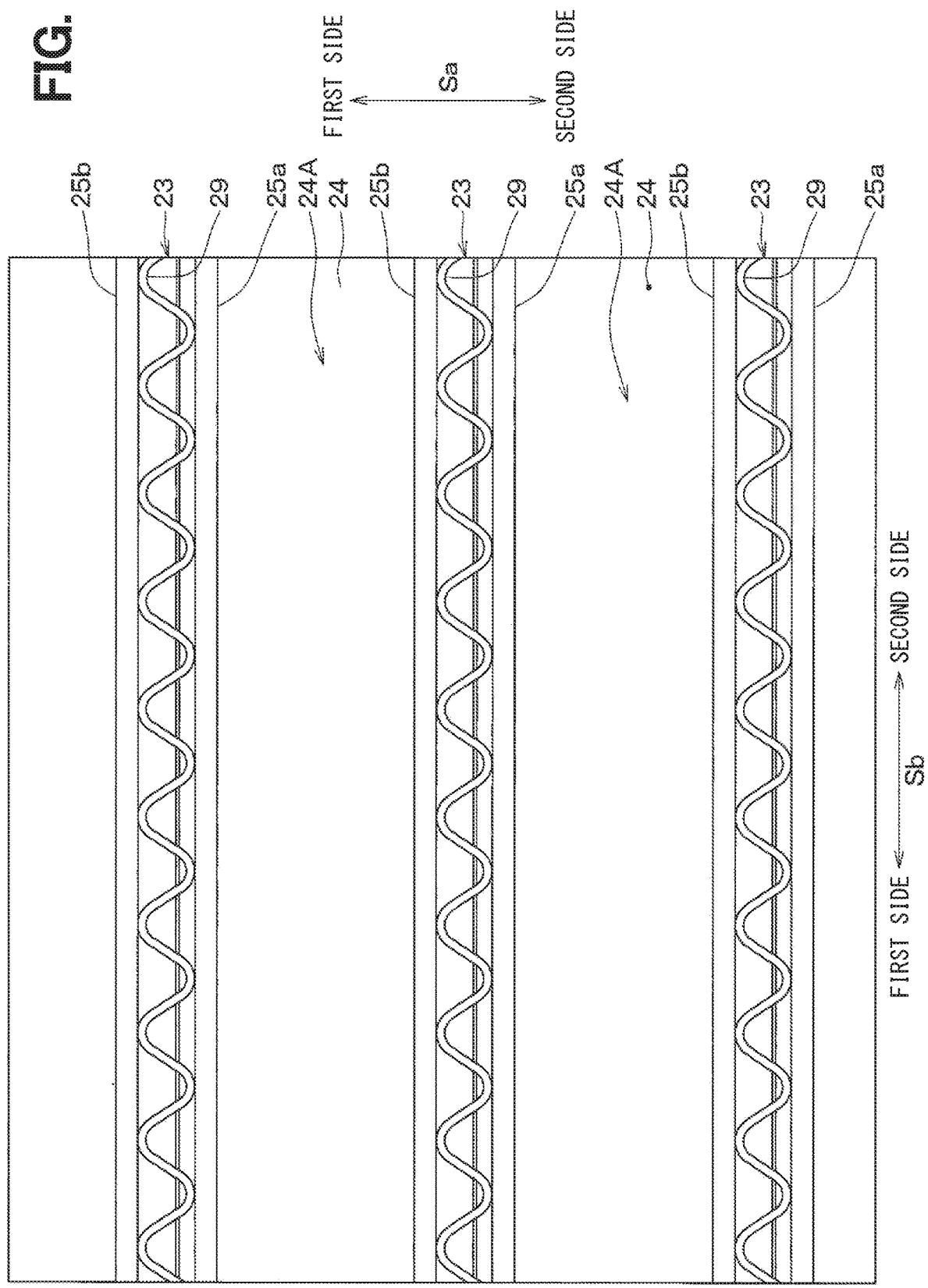
FIG. 9 is an enlarged view of IX part of FIG. 8.

As shown in FIGS. 8, 9, flow path tubes 23 and outer fins 24 are alternately stacked one by one with each other. The outer fin 24 is located between adjacent flow path tubes 23 of the flow path tubes 23. A first direction in which the flow path tubes 23 are stacked with each other is referred to as a stacking direction Sa.

The heat exchanger core 22 is configured to exchange heat between the cooling water flowing inside the flow path tubes 23 and the supercharged air flowing outside the flow path tubes 23 (that is, the supercharged air flowing through a supercharged air flow path 24A). The space in which the outer fin 24 is located between two adjacent flow path tubes 23 of the flow path tubes 23 constitutes a supercharged air flow path 24A through which the supercharged air flows.

The outer fin 24 (refer to FIGS. 9, 12) exchanges heat between the cooling water and the supercharged air. The outer fin 24 is a corrugated fin manufactured by shaping a plate into a wavy shape. The flow path tube 23 and the outer fin 24 of the present embodiment are made of a metal material such as aluminum. The outer fin 24 is brazed to the flow path tubes 23.

Figure 10:
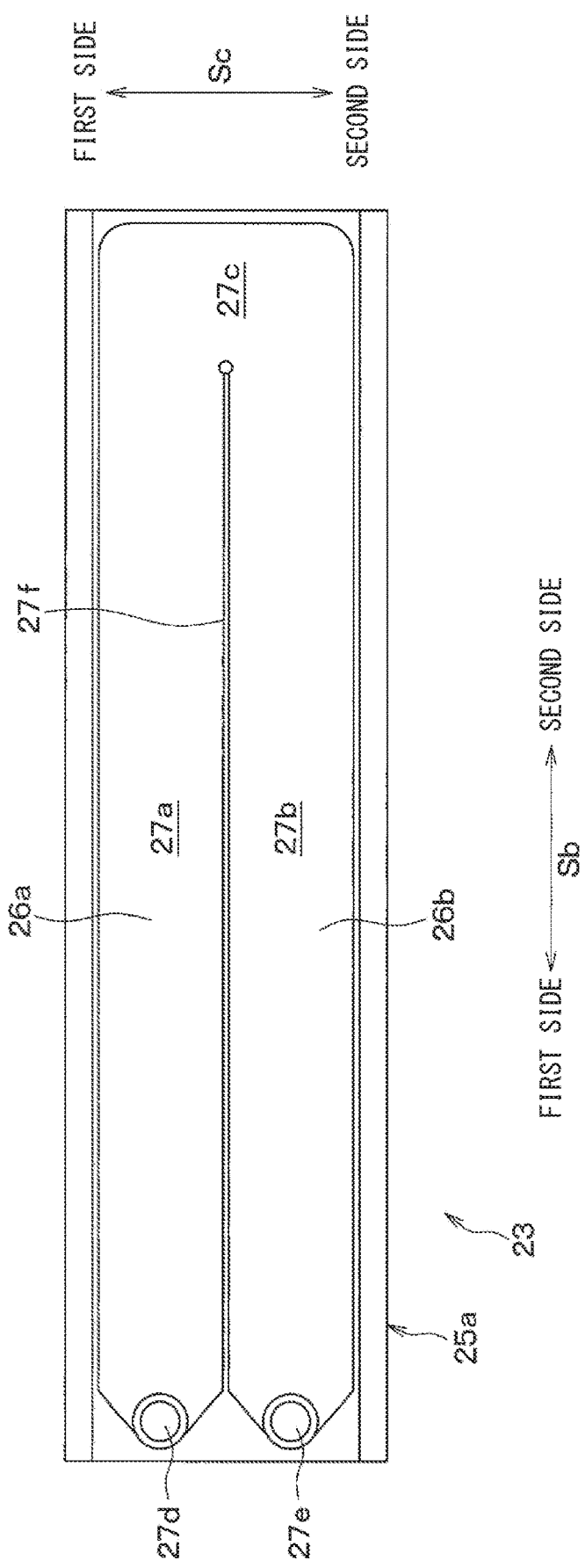
FIG. 10 is a diagram illustrating an inside of the flow path tube of FIG. 9, in which a plate 25b is omitted.
Figure 11:
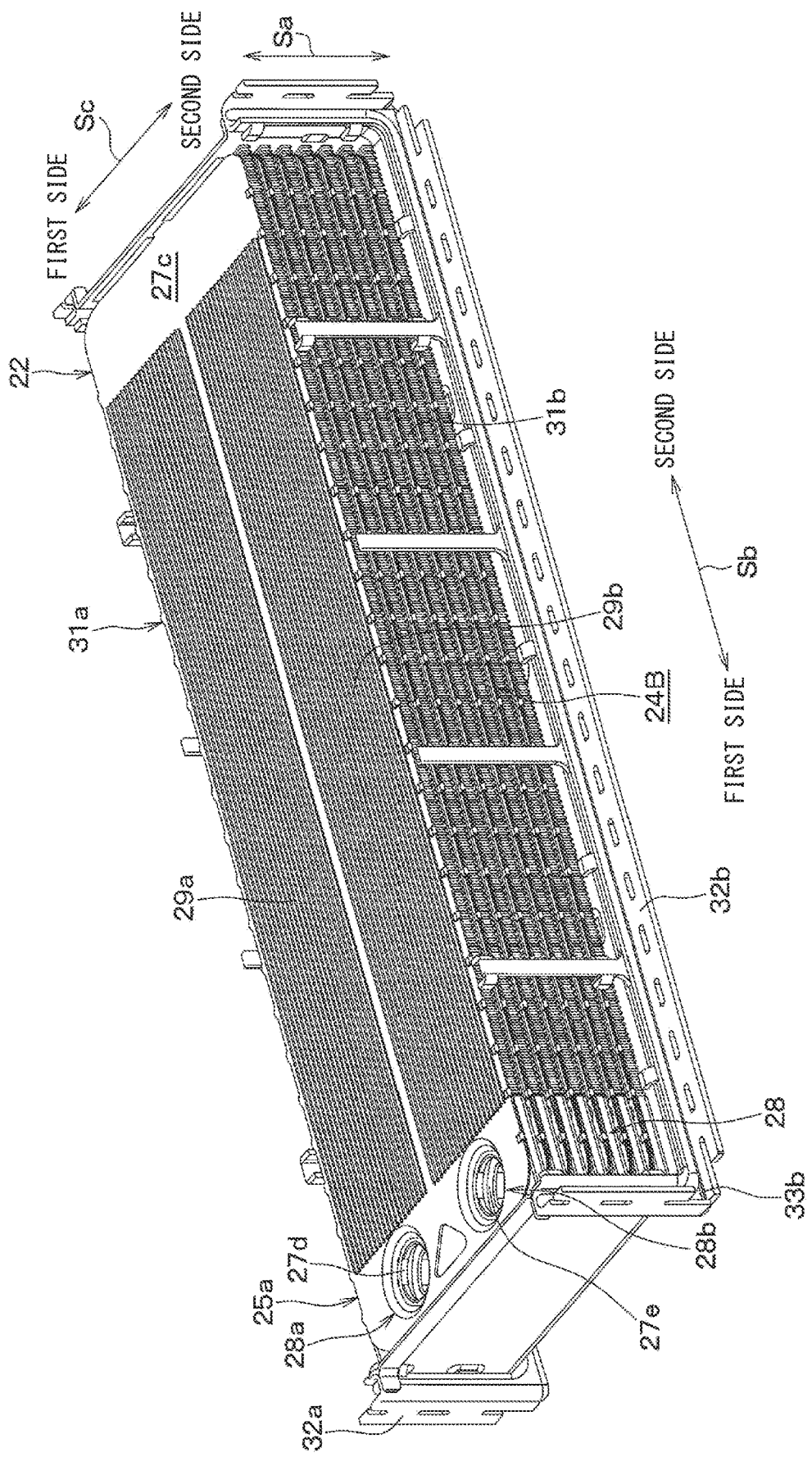
FIG. 11 is a perspective view illustrating an inside of the flow path tube, in which a part (that is, an upper part) of the stacked heat exchange portion and the frame of the heat exchanger core of FIG. 1 on one side in the stacking direction Sa is omitted.

As shown in FIGS. 9 and 10, each of the flow path tubes 23 has a flattened shape and is formed by joining a pair of plates 25a, 25b. Specifically, the plate 25a has recess portions 26a, 26b recessed toward a second side in the stacking direction Sa as shown in FIG. 10.

FIG. 10 is a cross-sectional diagram illustrating an inside of the flow path tube 23, and inner fins 29a, 29b described later are omitted in FIG. 10. The recess portions 26a, 26b of the plate 25a is closed by a plate 25b from the second side in the stacking direction Sa.

A cooling water flow path 27b through which the cooling water flows is defined as a first path between the recess portion 26b and the plate 25b. A cooling water flow path 27a through which the cooling water flows is defined as a return path between the recess portion 26a and the plate 25b. A second direction in which the cooling water flows through the cooling water flow paths 27a, 27b is referred to as a longitudinal direction Sb.

The longitudinal direction Sb is a longitudinal direction of the plates 25a, 25b and intersects with (specifically, perpendicular to) the stacking direction Sa. The cooling water flows through the cooling water flow path 27b toward a second side in the longitudinal direction Sb. The cooling water flows through the cooling water flow path 27a toward a first side in the longitudinal direction Sb.

The cooling water flow path 27b leads the cooling water from an inlet 27e to a U-turn portion 27c. The U-turn portion 27c is a cooling water flow path bent in a U-shape and causes the cooling water from the cooling water flow path 27b to make a U-turn.

The cooling water flow path 27a leads the cooling water from the U-turn portion 27c to an outlet 27d (refer to FIG. 10). The cooling water flow paths 27a, 27b and the U-turn portion 27c constitute a first fluid flow path through which the cooling water flows. The inlet 27e and the outlet 27d are formed by forming through-holes in the plates 25a, 25b, respectively.

The cooling water flow paths 27a, 27b are partitioned by a partitioning portion 27f. Inner fins 29a (refer to FIG. 11) are disposed inside the cooling water flow path 27a. The inner fin 29a is a straight fin that partitions the cooling water flow path 27a into multiple first cooling water flow paths.

The inner fins 29b are provided inside the cooling water flow path 27b. The inner fin 29b is a straight fin that partitions the cooling water flow path 27b into multiple second cooling water flow paths. The cooling water flow paths 27a, 27b are aligned in a supercharged air flow direction Sc.

The supercharged air flow direction Sc intersects with (specifically, perpendicular to) the stacking direction Sa and intersects with (specifically, perpendicular to) the longitudinal direction Sb, and the supercharged air flows through the supercharged air flow paths 24A in the supercharged air flow direction Sc.

Figure 12:
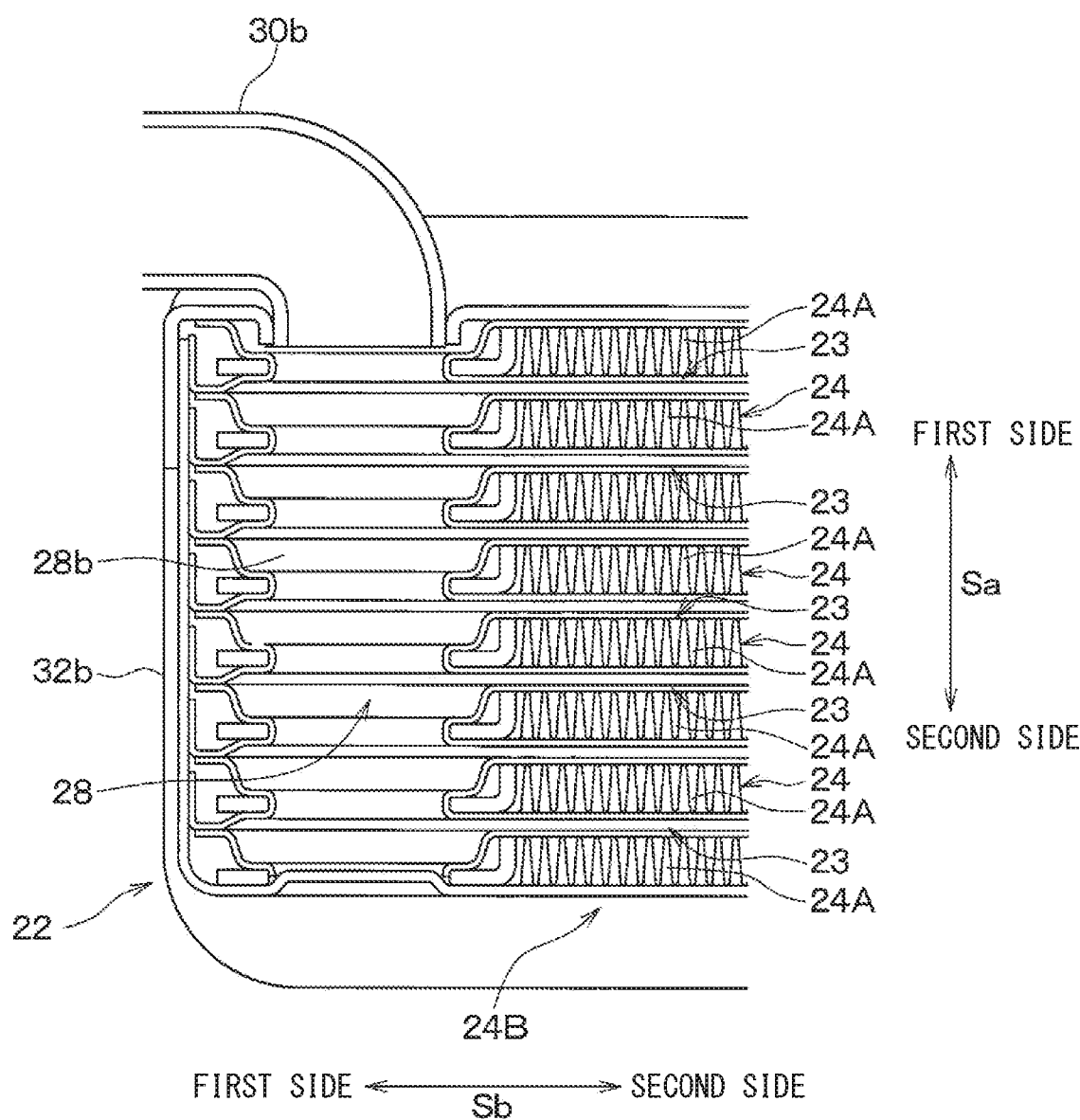
FIG. 12 is a diagram illustrating the intercooler viewed along an arrow Ya of FIG. 1, which is an enlarged view of a part of the intercooler one side in a longitudinal direction Sb of the intercooler.
Figure 13:
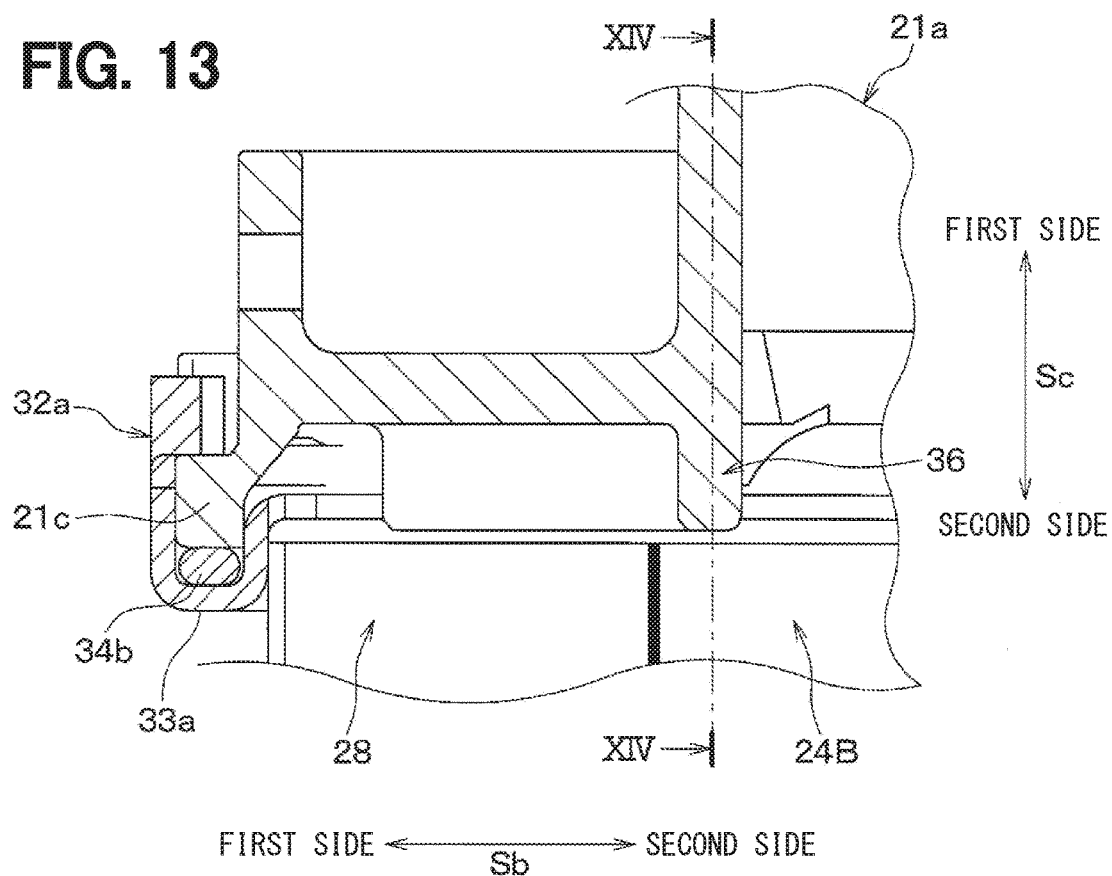
FIG. 13 is an enlarged view of VIII part of FIG. 6.
Figure 14:
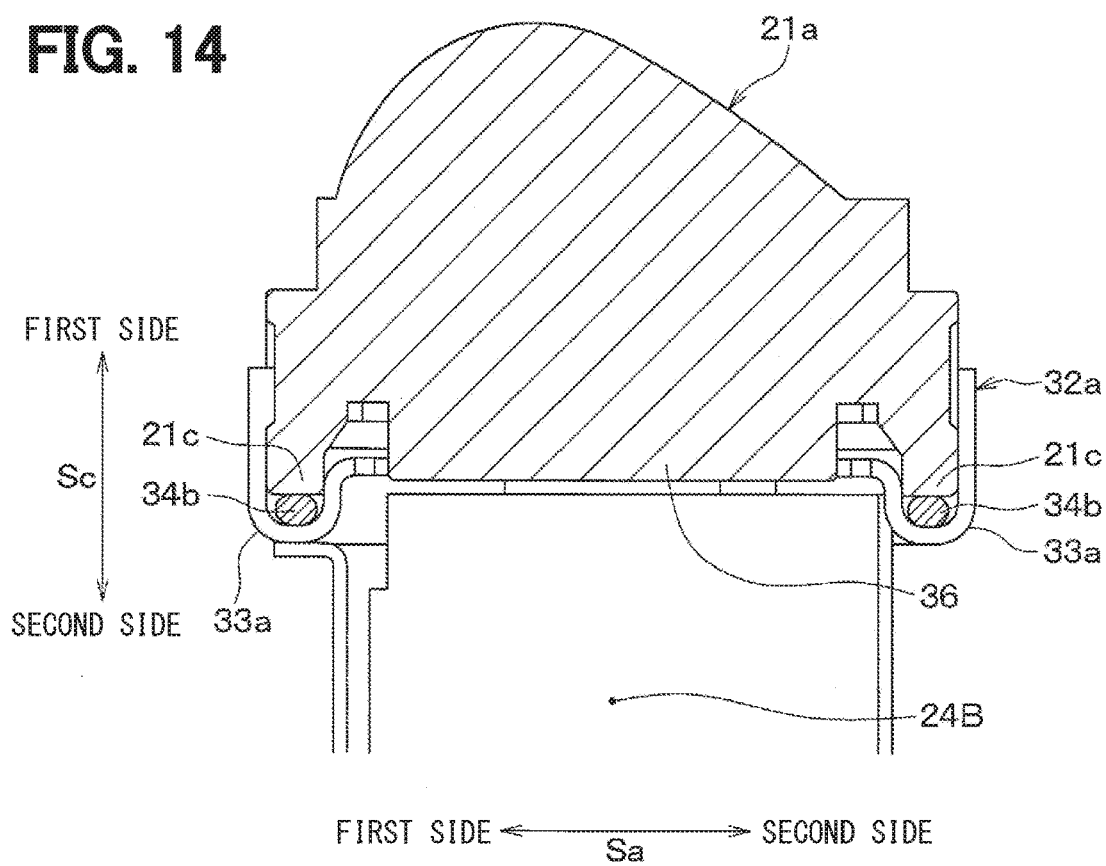
FIG. 14 is a cross-sectional view taken along line XIV-XIV of FIG. 13.
Figure 15:
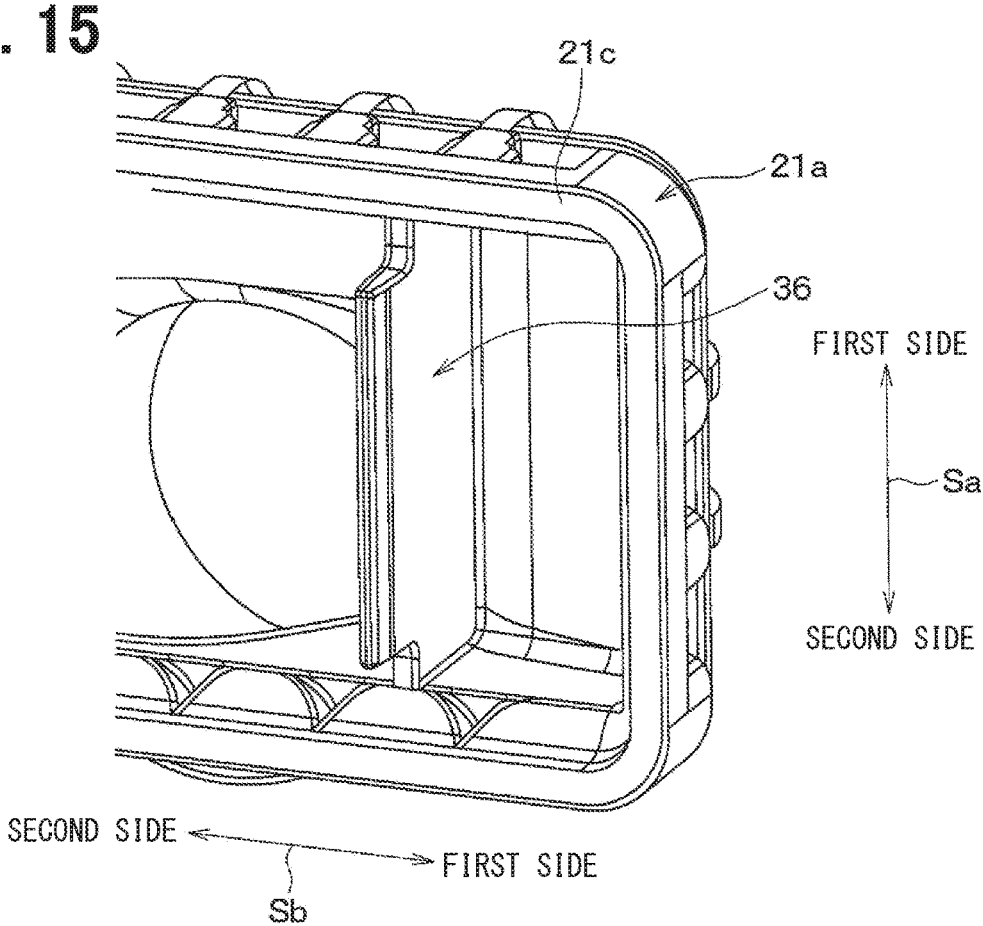
FIG. 15 is a perspective view illustrating a part of the intake tank on one side in the longitudinal direction Sb.
Figure 16:
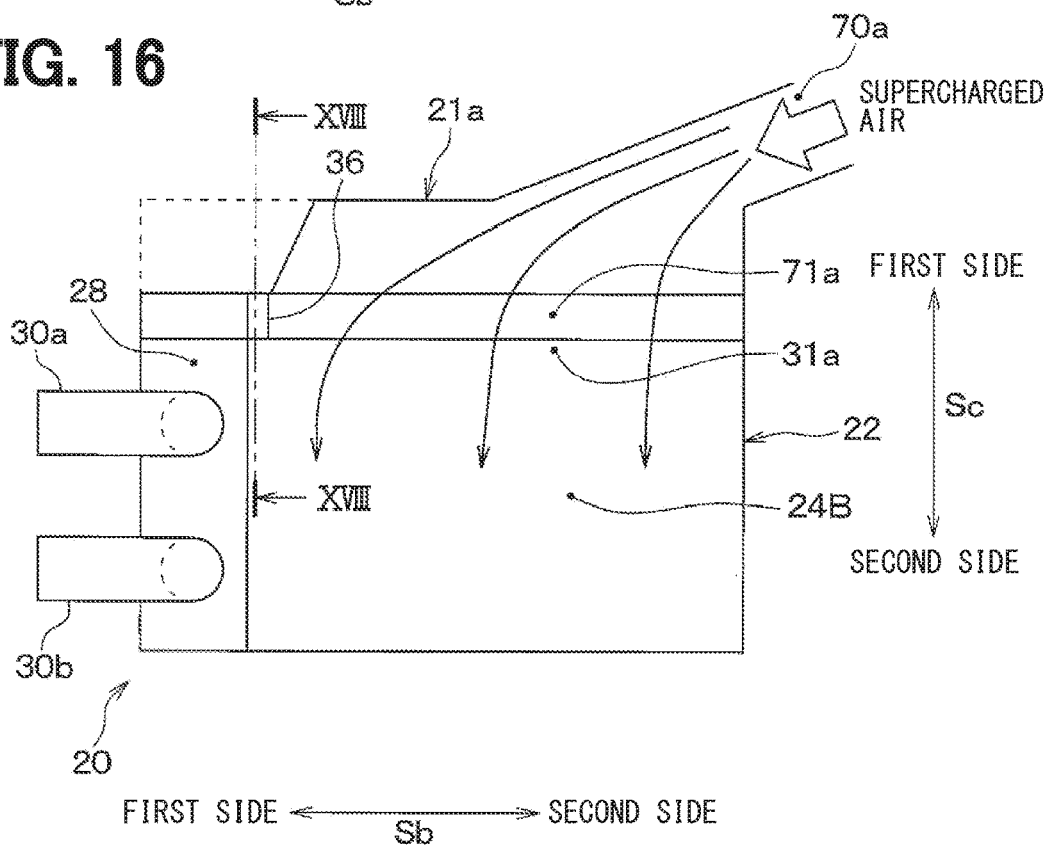
FIG. 16 is a schematic diagram for illustrating a flow of a supercharged air in the intake tank of the intercooler of FIG. 1.

The cooling water flow paths 27a, 27b and the outer fins 24 (that is, the supercharged air flow path 24A) are arranged alternately to form a stacked heat exchange portion 24B (refer to FIG. 12).

A distribution portion 28b is configured by connecting the inlets 27e of the two adjacent flow path tubes 23 of the flow path tubes 23 of the present embodiment. The distribution portion 28b distributes the cooling water to the cooling water flow paths 27b of the flow path tubes 23. The distribution portion 28b is connected to a cooling water pipe 30b.

A collection portion 28a is configured by connecting the outlets 27d of the two adjacent flow path tubes 23 of the flow path tubes 23. The collection portion 28a is configured to collect the cooling water from the cooling water flow paths 27a of the flow path tubes 23. The collection portion 28a is connected to a cooling water pipe 30a. The cooling water pipes 30a, 30b constitute a part of the cooling water circuit 60.

In the present embodiment, the distribution portion 28b and the collection portion 28a are located on the first side of the cooling water flow path 27a, 27b, and the U-turn portion 27c in the longitudinal direction Sb. The distribution portion 28b and the collection portion 28a are offset from each other in the supercharged air flow direction Sc.

Specifically, the distribution portion 28b is located on a second side of the collection portion 28a in the supercharged air flow direction Sc. In the present embodiment, the distribution portion 28b and the collection portion 28a constitute a cup portion 28 (that is, distribution-collection portion). Two adjacent flow path tubes 23 of the flow path tubes 23 are in contact with each other in the cup portion 28. Accordingly, in the cup portion 28, the supercharged air flow path 24A (and the outer fin 24) is not formed between adjacent two flow path tubes 23 of the flow path tubes 23. The heat exchange between the cooling water and the supercharged air is not performed in the cup portion 28.

An air inlet 31a is formed on an end of the stacked heat exchange portion 24B of the heat exchanger core 22 on a first side in the supercharged air flow direction Sc. A frame 32a is disposed on the first side of the heat exchanger core 22 in the supercharged air flow direction Sc as a holding portion (that is, crimping plate) for holding the intake tank 21a.

The frame 32a of the present embodiment is fixed to the heat exchanger core 22 by brazing. Accordingly, the frame 32a is held by the heat exchanger core 22. The frame 32a is located on the first side of the heat exchanger core 22 in the supercharged air flow direction Sc and has an annular shape surrounding the cup portion 28 (that is, the collection portion 28a) and the stacked heat exchange portion 24B.

The frame 32a has a groove portion 33a having an annular shape surrounding the cup portion 28 and the stacked heat exchange portion 24B. A packing member 34a is disposed in the groove portion 33a. The packing member 34a is elastically compressed between the frame 32a and an annular protrusion 21c of the intake tank 21a, and seals a gap between the frame 32a and the intake tank 21a.

The annular protrusion 21c of the intake tank 21a has an annular shape surrounding the air inlet 31a and protrudes toward the second side in the supercharged air flow direction Sc.

An air outlet 31b is formed on an end of the stacked heat exchange portion 24B of the heat exchanger core 22 on the second side in the supercharged air flow direction Sc. A frame 32b is disposed on the second side of the heat exchanger core 22 in the supercharged air flow direction Sc as the discharge tank 21b (that is, crimping plate).

The frame 32b of the present embodiment is fixed to the heat exchanger core 22 by brazing. Accordingly, the frame 32b is held by the heat exchanger core 22. The frame 32b is located on the second side of the heat exchanger core 22 in the supercharged air flow direction and surrounds the cup portion 28 (that is, the distribution portion 28b) and the stacked heat exchange portion 24B.

The frame 32b has a groove portion 33b having a rectangular shape surrounding the cup portion 28 and the stacked heat exchange portion 24B. A packing member 34b having an annular shape surrounding the cup portion 28 and the stacked heat exchange portion 24B is disposed in the groove portion 33b. The packing member 34b is elastically compressed between the frame 32b and an annular protrusion (not shown) of the discharge tank 21b, and seals a gap between the frame 32b and the discharge tank 21b.

The annular protrusion of the discharge tank 21b has an annular shape surrounding the heat exchanger core 22, and protrudes toward the first side in the supercharged air flow direction Sc.

The intake tank 21a covers the air inlet 31a of the heat exchanger core 22 and has an air inlet 70a and an air outlet 71a. The air inlet 70a is an inlet through which the supercharged air compressed by the supercharger 15 flows. The air outlet 71a is an outlet through which the supercharged air flowing through the air inlet 70a flows toward the air inlet 31a of the heat exchanger core 22.

The discharge tank 21b covers the air outlet 31b of the heat exchanger core 22, and has an air outlet 70b and an air inlet 71b. The air inlet 71b is an inlet through which the supercharged air discharged from the air outlet 31b of the heat exchanger core 22 flows. The supercharged air flowing through the air inlet 71b flows toward the engine 10 through the air outlet 70b.

Engagement portions 32c are formed by plastically deforming and crimping the frame 32a. The engagement portions 32c are engaged with the intake tank 21a, and the intake tank 21a is held by the frame 32a. Accordingly, the intake tank 21a is held by the air inlet 31a of the heat exchanger core 22 through the frame 32a.

Engagement portions 32c are formed by plastically deforming and crimping the frame 32b. The engagement portions 32c are engaged with the discharge tank 21b, and the discharge tank 21b is held by the frame 32b. Accordingly, the discharge tank 21b is held by the air outlet 31b of the heat exchanger core 22 through the frame 32b.

The intake tank 21a of the present embodiment has a flow limiting wall 36 as a first wall portion. The flow limiting wall 36 is a flow limiting portion configured to suppress an inflow of the supercharged air flowing through the intake tank 21a into the collection portion 28a (that is, cup portion 28).

Figure 18:
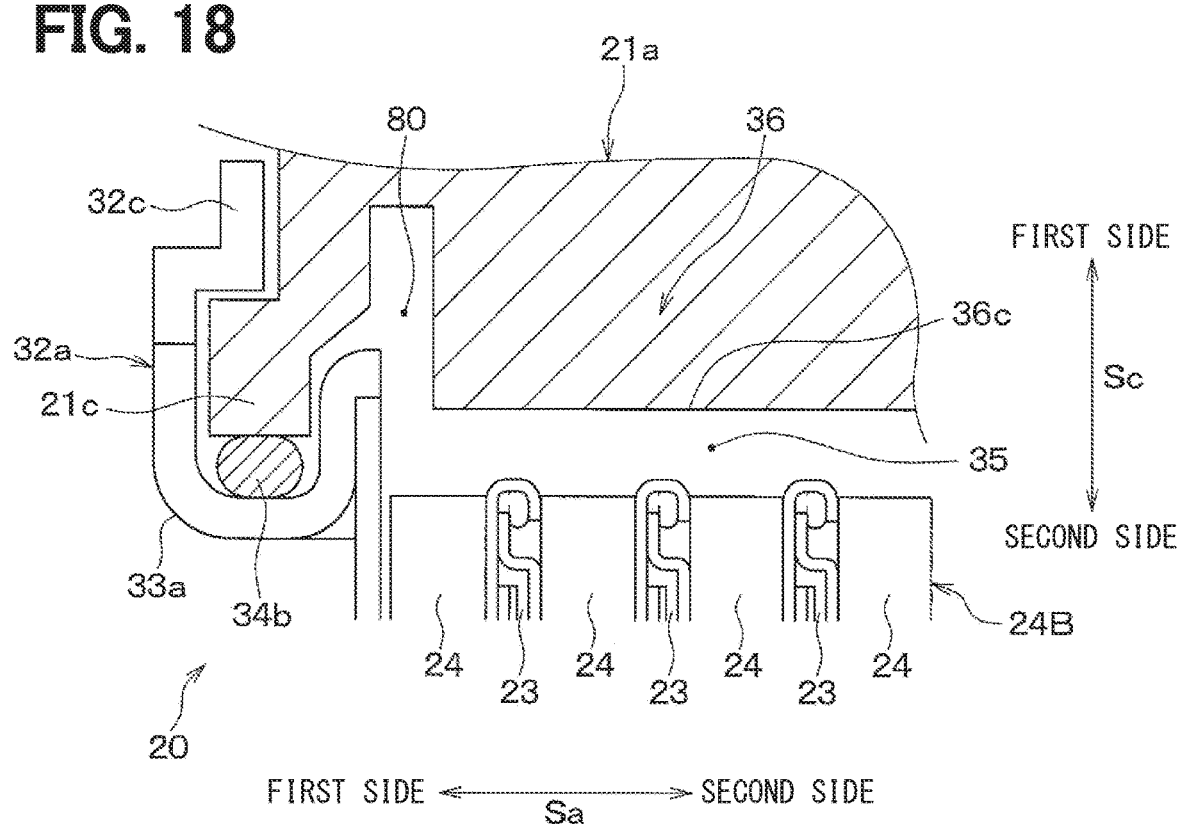
FIG. 18 is a cross-sectional diagram taken along the line XVIII-XVIII of FIG. 16.
Figure 19:
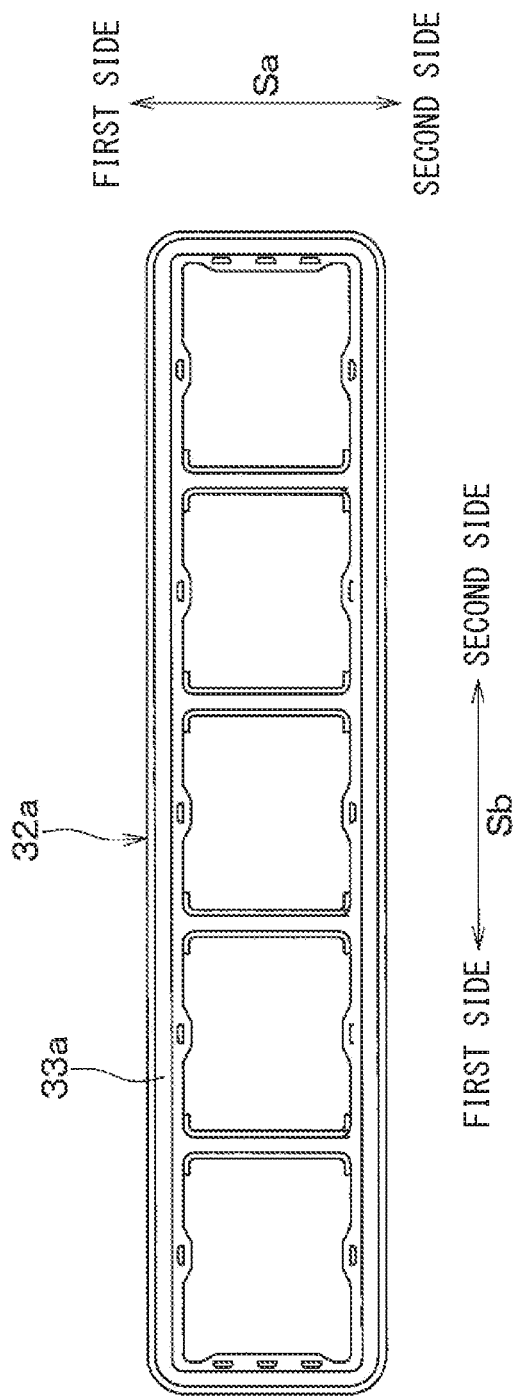
FIG. 19 is a diagram illustrating a frame of FIG. 1 which is not crimped yet viewed from one side in the supercharged air flow direction Sc.
Figure 20A:
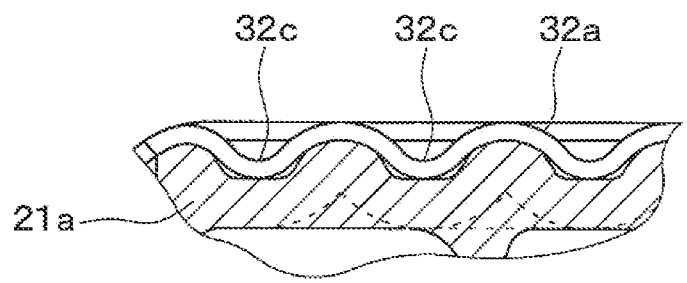
FIG. 20A is an enlarged diagram of XX part of FIG. 5, in which the frame is not crimped yet.
Figure 20B:
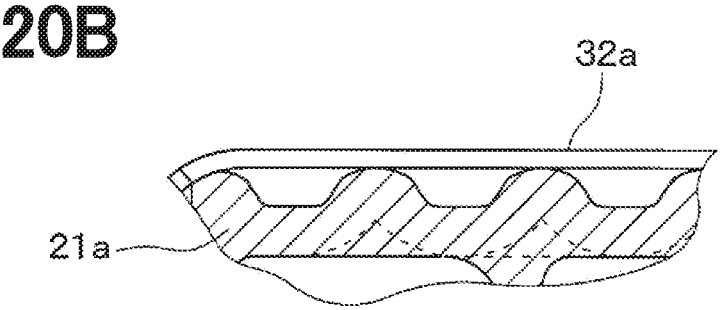
FIG. 20B is an enlarged diagram of XX part of FIG. 5, in which the frame has been crimped.

The flow limiting wall 36 is located on the stacked heat exchange portion 24B side of the collection portion 28a. That is, the flow limiting wall 36 is located on the first side in the supercharged air flow direction Sc with respect to the stacked heat exchange portion 24B. A clearance 35 is defined between the stacked heat exchange portion 24B and an end portion 36c of the flow limiting wall 36 facing the stacked heat exchange portion 24B (refer to FIG. 18). The flow limiting wall 36 is a wall portion extending in the supercharged air flow direction Sc and in the stacking direction Sa.

The intake tank 21a and the flow limiting wall 36 are made of a metal material (or resin material) such as aluminum and formed integrally with each other. That is, the intake tank 21a and the flow limiting wall 36 are formed as a single component.

The discharge tank 21b has a flow limiting wall (not shown). The flow limiting wall is a flow limiting portion configured to suppress an inflow of the supercharged air flowing from the air outlet 31b of the stacked heat exchange portion 24B to the air outlet 70b into the distribution portion 28b (that is, the cup portion 28).

The flow limiting wall is located on the stacked heat exchange portion 24B side of the distribution portion 28b. That is, the flow limiting wall is located on the second side in the supercharged air flow direction Sc with respect to the stacked heat exchange portion 24B. A clearance is defined between the stacked heat exchange portion 24B and an end portion of the flow limiting wall facing the stacked heat exchange portion 24B. The flow limiting wall is a wall portion extending in the supercharged air flow direction Sc and in the stacking direction Sa.

The discharge tank 21b and the flow limiting wall are made of a metal material (or resin material) such as aluminum and formed integrally with each other. That is, the discharge tank 21b and the flow limiting wall are formed as a single component.

The flow limiting wall is located on the stacked heat exchange portion 24B side of the collection portion 28a. A clearance is defined between the stacked heat exchange portion 24B and an end portion of the flow limiting wall facing the stacked heat exchange portion 24B.

Next, the operation of the supercharged air cooling system 1 of the present embodiment will be described.

First, the water pump 61 is driven by driving force output from the engine 10.

At this time, in the cooling water circuit 60, the water pump 61 draws the cooling water flowing from an outlet of the radiator 62 and cause the cooling water to flow toward an inlet of the radiator 62 through the intercooler 20.

The cooling water flowing through the radiator 62 is distributed by the distribution portion 28b into the flow path tubes 23 after flowing through the cooling water pipe 30b. The cooling water distributed to the flow path tubes 23 are collected by the collection portion 28a after flowing through the cooling water flow path 27b, the U-turn portion 28c, and the cooling water flow path 27a, and subsequently the cooling water flows toward the outlet of the water pump 61 through the cooling water pipe 30a.

In contrast, the supercharged air compressed by the supercharger 15 flows toward the intake tank 21a through the air inlet 70a. The supercharged air flows from the intake tank 21a through the air inlet 31a, the supercharged air flow path 24A of the stacked heat exchange portion 24B, the air outlet 31b, and the discharge tank 12b, and subsequently flows from the air outlet 70b toward the engine 10.

The supercharged air in the intake tank 21a is limited from flowing into the cup portion 28 by the flow limiting wall 36. The supercharged air in the discharge tank 21b is limited from flowing into the cup portion 28 by the flow limiting wall.

Accordingly, when the cooling water flows through the cooling water flow path 27b, the U-turn portion 27c, and the cooling water flow path 27a, the cooling water exchanges heat with the supercharged air flowing through the supercharged air flow path 24A. Therefore, the supercharged air is cooled by the cooling water.

Next, a method of manufacturing the intercooler 20 of the present embodiment will be described below.

First, the heat exchange core 22, the intake tank 21a, and the discharge tank 21b are prepared in advance. In the heat exchanger core 22, the frames 32a, 32b are joined with the cup portion 28 and the stacked heat exchange portion 24B by brazing in advance.

The intake tank 21a and the flow limiting wall 36 are integrated with each other to be a single component. The discharge tank 21b and the flow limiting wall (not shown) are integrated with each other to be a single component.

Next, the intake tank 21a and the heat exchanger core 22 are arranged such that the air outlet 71a of the intake tank 21a covers the air inlet 31a of the heat exchanger core 22. Further, the discharge tank 21b and the heat exchanger core 22 are arranged such that the air inlet 71b of the discharge tank 21b covers the air outlet 31b of the heat exchanger core 22.

Next, the intake tank 21a is held by the heat exchanger core 22 using the engagement portions 32c of the frame 32a. Further, the discharge tank 21b is held by the heat exchanger core 22 using the engagement portions 32c of the frame 32b.

The clearance 35 is defined between the stacked heat exchange portion 24B and an end portion 36c of the flow limiting wall 36 facing the stacked heat exchange portion 24B. Accordingly, the intercooler 20 is manufactured.

According to the above-described present embodiment, the cooling water flow paths 27a (27b) through which the cooling water flows are aligned in the stacking direction Sa in the intercooler 20, and the intercooler 20 includes the stacked heat exchange portion 24B in which the supercharged air flow paths 24A are defined between two adjacent cooling water flow paths 27a (27b) of the cooling water flow paths 27a (27b). The supercharged air flows through the supercharged air flow paths 24A.

The intercooler 20 includes the distribution portion 28b configured to distribute the cooling water to the cooling water flow paths 27b, and the collection portion 28a configured to collect the cooling water from the cooling water flow paths 27a. The distribution portion 28b and the collection portion 28a are located on the first side of the cooling water flow paths 27a, 27b in the longitudinal direction Sb.

The distribution portion 28b and the collection portion 28a are arranged to be offset from each other in the supercharged air flow direction Sc, and collectively constitute the cup portion 28 in which the supercharged air flow path 24A is not defined. The intercooler 20 includes the intake tank 21a having the inlet 70a through which the supercharged air flows therein. The intake tank 21a guides the supercharged air toward the inlet of the supercharged air flow paths 24A of the heat exchanger core 22.

The intercooler 20 is configured to exchange heat between the supercharged air and the cooling water flowing through the cooling water flow paths 27a, 27b. The intercooler 20 has the flow limiting wall 36 configured to limit the supercharged air flowing through the intake tank 21a from flowing into the cup portion 28. The flow limiting wall 36 and the intake tank 21a are formed as a single component.

Since the supercharged air is limited from flowing into the cup portion 28, the flow limiting wall 36 improves the cooling performance for cooling the supercharged air by the cooling water in the heat exchanger core 22.

In addition, in the present embodiment, the number of components of the intercooler 20 can be reduced compared to a case where the flow limiting wall 36, the heat exchanger core 22, and the intake tank 21a are separated components.

Accordingly, the cooling performance of the intercooler 20 can be improved, and the number of the components can be reduced.

In the present embodiment, the clearance 35 is defined between the stacked heat exchange portion 24B and an end portion 36c of the flow limiting wall 36 facing the stacked heat exchange portion 24B. Accordingly, the clearance 35 is defined between the flow limiting wall 36 and the plates 25a, 25b. Therefore, an interference of the flow limiting wall 36 causing a deformation of the plates 25a, 25b can be avoided, and a deterioration in heat exchange performance between the cooling water and the supercharged air due to the deformed plates 25a, 25b can be avoided.

Figure 17:
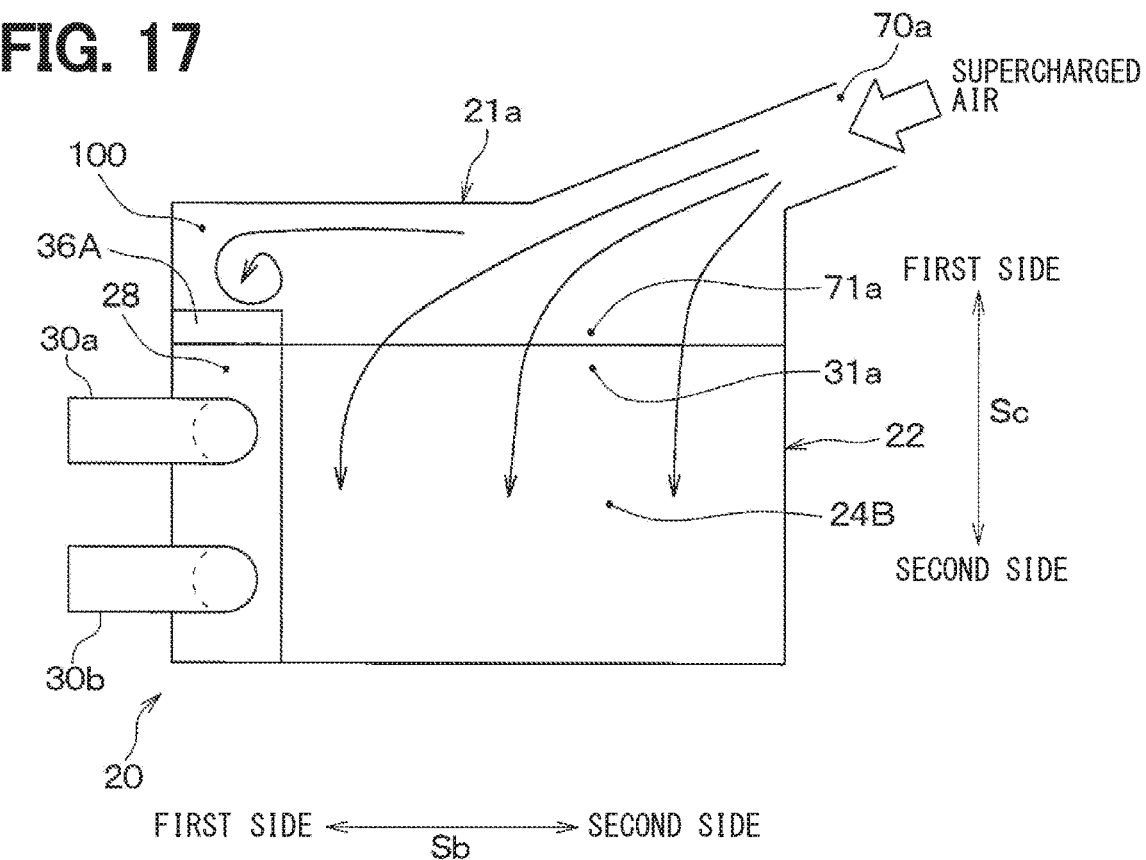
FIG. 17 is a schematic diagram for illustrating a flow of a supercharged air in an intake tank of an intercooler of a comparative example.

For example, when the frame 32a has the flow limiting wall 36A, a dead space that may cause a vortex in the supercharged air and increase a resistance to flow of the supercharged air is formed in a part of the intake tank 21A covering the cup portion 100 (that is, the flow limiting wall 36A, see FIG. 17).

In view of the above-described point, the dead space can be omitted in the present embodiment because the flow limiting wall 36 and the intake tank 21a are formed as a single component.

When the frame 32a is joined to the heat exchanger core 22 after fixing the flow limiting wall 36A to the frame 32a, the frame 32a has an asymmetric shape in the longitudinal direction Sb. In this case, a direction in which the frame 32a is assembled to the heat exchanger core 22 is limited and may cause a decrease in manufacturability.

In contrast, since the flow limiting wall 36 is not fixed to the frame 32a in the present embodiment, the frame 32a has a symmetric shape in the longitudinal direction Sb. Accordingly, the direction in which the frame 32a is assembled to the heat exchanger core 22 does not cause a decrease in manufacturability.

Second Embodiment

In a second embodiment of the present disclosure, an example will be described with reference to FIG. 21, in which an inflow of the supercharged air into the cup portion 28 through a clearance 80 between the frame 32a and the flow limiting wall 36 is suppressed.

Figure 21:
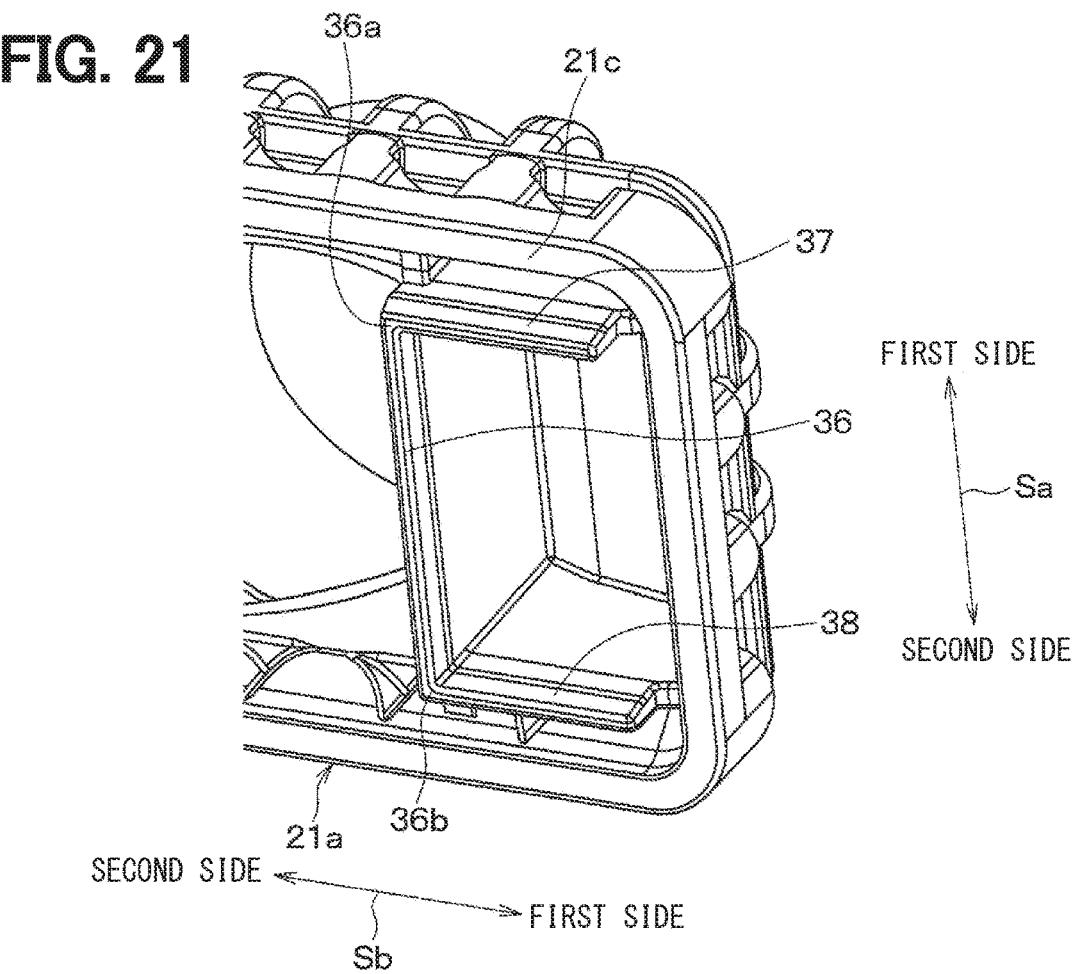
FIG. 21 is a perspective view illustrating a part of an intake tank of an intercooler according to at least one embodiment.

A part of the intake tank 21a of the intercooler of the present embodiment on the first side in the longitudinal direction Sb is illustrated in FIG. 21.

In the intake tank 21a of the present embodiment, flow limiting walls 37, 38 are added to the intake tank 21a of the first embodiment.

The flow limiting wall 37 is located on the first side of the cup portion 28 in the supercharged air flow direction Sc. The flow limiting wall 37 is a second wall portion that extends from a first side end portion 36a of the flow limiting wall 36 in the stacking direction Sa toward the first side in the longitudinal direction Sb. A clearance is defined between the frame 32a and the first side end portion 36a of the flow limiting wall 36 in the stacking direction Sa. A clearance is defined between the flow limiting wall 37 and the frame 32a.

The flow limiting wall 38 is located on the first side of the cup portion 28 in the supercharged air flow direction Sc. The flow limiting wall 38 is a third wall portion that extends from a second side end portion 36b of the flow limiting wall 36 in the stacking direction Sa toward the first side in the longitudinal direction Sb. A clearance is defined between the frame 32a and the second side end portion 36b of the flow limiting wall 36 in the stacking direction Sa. A clearance is defined between the flow limiting wall 38 and the frame 32a.

Accordingly, the flow limiting walls 36, 37, 38 form a U-shape (or a C-shape) on the first side of the cup portion 28 in the supercharged air flow direction Sc. Therefore, an inflow of the supercharged air into the cup portion 28 through the clearance between the frame 32a and the first side end portion 36a of the flow limiting wall 36 in the stacking direction Sa can be suppressed. Also, an inflow of the supercharged air into the cup portion 28 through the clearance between the frame 32a and the second side end portion 36b of the flow limiting portion 36 in the stacking direction Sa can be suppressed. Accordingly, the supercharged air is limited from flowing into an area in the cup portion 28 defined by the flow limiting walls 36, 37, 38.

Third Embodiment

Figure 22:
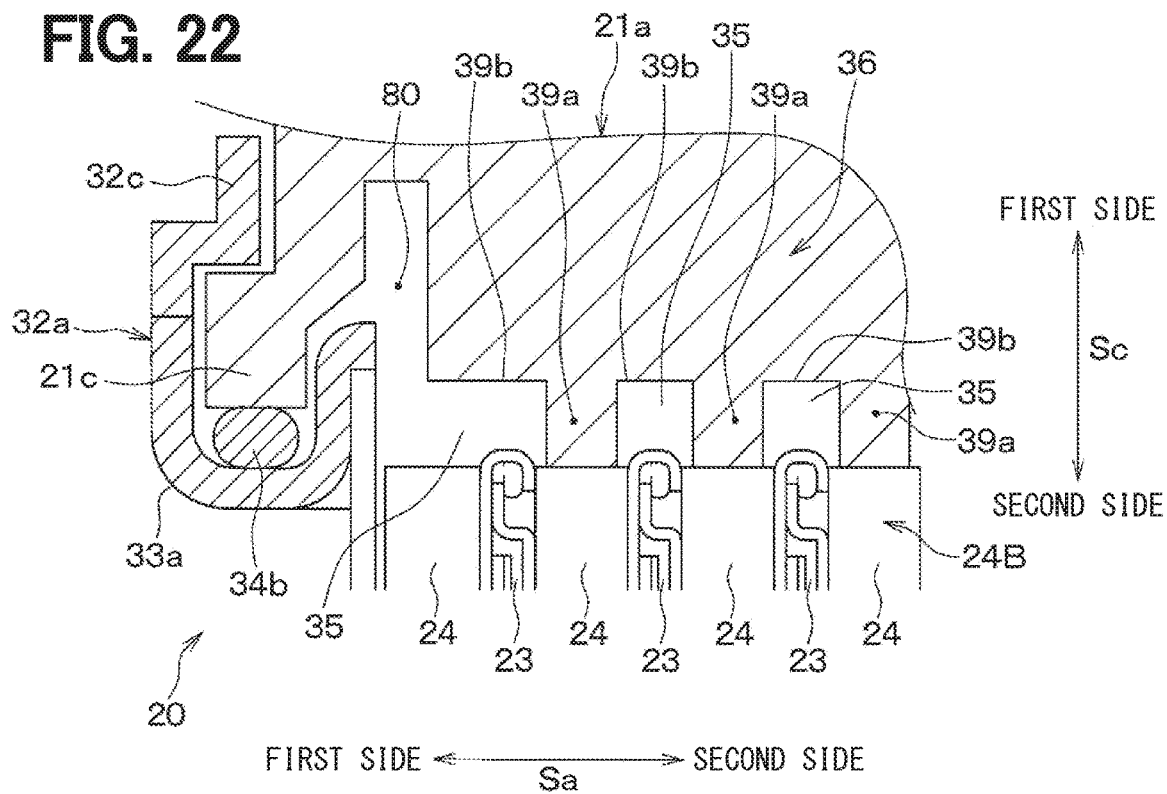
FIG. 22 is a cross-sectional diagram of an intake tank according to at least one embodiment.

In the first embodiment, the clearance 35 defined between the flow limiting wall 36 and the stacked heat exchange portion 24B extends in the stacking direction Sa. In a third embodiment, an end portion of the flow limiting wall 36A facing the stacked heat exchange portion 24B has a comb teeth shape as shown in FIG. 22.

The end portion of the flow limiting wall 36 facing the stacked heat exchange portion 24B of the present embodiment has protrusion portions 39a and the recess portions 39b alternately arranged one by one in the stacking direction Sa. The protrusion portion 39a protrudes toward the stacked heat exchange portion 24B (that is, toward the second side in the supercharged air flow direction Sc). The recess portion 39b is recessed in a direction away from the stacked heat exchange portion 24B (that is, toward the first side in the supercharged air flow direction Sc).

That is, the protrusion portions 39a are aligned in the stacking direction Sa on the end portion of the flow limiting wall 36 facing the stacked heat exchange portion 24B, and the recess portion 39b is formed between two adjacent protrusion portions 39a of the protrusion portions 39a. The protrusion portions 39a are in contact with the outer fins 24. The recess portions 39 define the clearance 35 together with the flow path tubes 23.

According to the present embodiment, in the intercooler 20, the protrusion portions 39a and the recess portions 39b are alternately arranged in the stacking direction Sa on the end portion of the flow limiting wall 36 facing the stacked heat exchange portion 24B. Accordingly, the clearance 35 between the flow limiting wall 36 and the stacked heat exchange portion 24B can be small. Therefore, the supercharged air flowing into the cup portion 28 through the clearance 35 can be reduced.

In the flow limiting wall 36 of the present embodiment, the protrusion portions 39a are in contact with the outer fins 24, and the clearance 35 is defined by the recess portions 39b and the flow path tube 23. Accordingly, the clearance 35 between the flow limiting wall 36 and the stacked heat exchange portion 24B can be small, and the interference of the flow limiting wall 36 with the flow path tube 23 can be suppressed. Therefore, a deterioration in heat exchange performance due to interference of the flow limiting wall 36 with the stacked heat exchange portion 24B can be avoided.

Fourth Embodiment

In the second embodiment, the flow limiting walls 36, 37, 38 are provided. In a fourth embodiment, the area defined by the flow limiting walls 36, 37, 38 in the cup portion 28 is filled with a filler portion 91.

Figure 23:
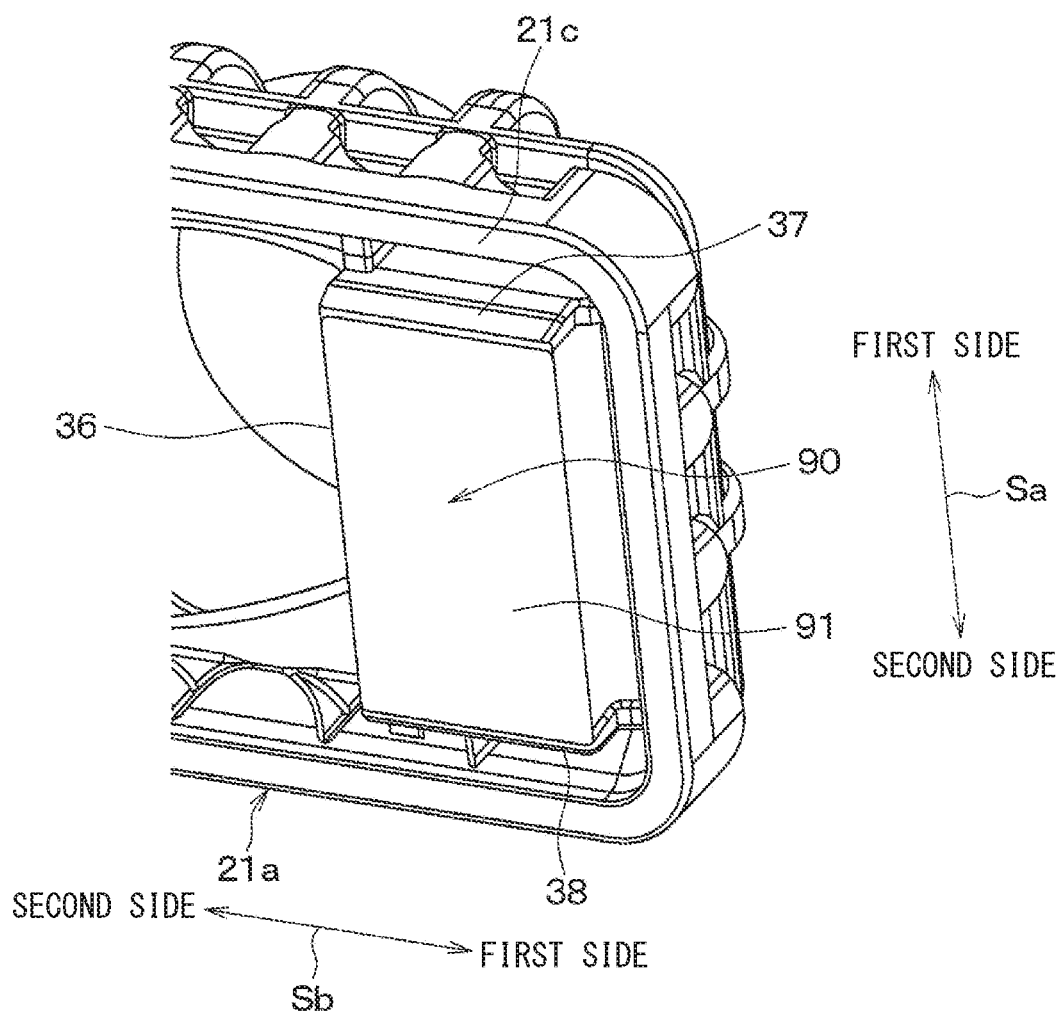
FIG. 23 is a perspective view illustrating a part of an intake tank of an intercooler according to at least one embodiment.

A part of the intake tank 21a of the intercooler 20 of the present embodiment on the first side in the longitudinal direction Sb is illustrated in FIG. 23.

In the intake tank 21a of the present embodiment, the area described in the second embodiment which is defined by the flow limiting walls 36, 37, 38 in the cup portion 28 is filled with the filler portion 91.

The filler portion is made of at least one of metal material or resin material. That is, the area in the cup portion 28 defined by the flow limiting walls 36, 37, 38 is filled with at least one of metal material or resin material. Aluminum may be used as the metal material, for example. Accordingly, a closing portion 90 configured to close the part in the cup portion 28 surrounded by the flow limiting walls 36, 37, 38 is provided.

According to the present embodiment, in the intercooler 20, the part in the cup portion 28 surrounded by the flow limiting walls 36, 37, 38 is filled with the filler portion 91. Therefore, the supercharged air can be surely limited from flowing into the cup portion 28 through a clearance 80.

Other Embodiments (1) In the above-described first to fourth embodiments, the intercooler 20 that cools the supercharged air as a first fluid by the cooling water as a second first fluid is used as an example of the heat exchanger of the present disclosure. However, a heating heat exchanger that heats a first fluid by a second fluid through heat exchange between the first fluid and the second fluid may be used as the heat exchanger of the present disclosure.

(2) In the above-described first to fourth embodiments, the cup portion 28 (that is, the distribution portion 28b and the collection portion 28a) is located on the one side of the cooling water flow paths 27a, 27b in the longitudinal direction Sb. However, the distribution portion 28b and the collection portion 28a may be located as follows.

The distribution portion 28b may be located on the first side of the cooling water flow paths 27a, 27b in the longitudinal direction Sb, and the collection portion 28a may be located on the second side of the cooling water flow paths 27a, 27b in the longitudinal direction Sb.

In this case, two flow limiting walls 36 are formed on the intake tank 21a. An inflow of the supercharged air into the distribution portion 28b is suppressed by one of the two flow limiting walls 36. An inflow of the supercharged air into the collection portion 28a is suppressed by the other one of the two flow limiting walls 36.

(3) In the above-described first to fourth embodiments, the collection portion 28a is located on an upstream side in the supercharged air flow direction Sc, and the distribution portion 28b is located on a downstream side in the supercharged air flow direction Sc. However, the distribution portion 28b may be located on the downstream side in the supercharged air flow direction Sc, and the collection portion 28a may be located on the upstream side in the supercharged air flow direction Sc.

(4) In the above-described first to fourth embodiments, the cooling water flow path includes cooling water flow paths 27a, 27b and one U-turn portion 27c, and accordingly the cooling water flow path has a U-shape. However, the cooling water flow path may have a W-shape. That is, the cooling water flow path may have multiple U-turn portions each of which causes the cooling water to make a U-turn.

(5) In the fourth embodiment, the area in the cup portion 28 defined by the flow limiting walls 36, 37, 38 is filled with the filler portion 91. However, the area in the cup portion 28 defined by the flow limiting walls 36, 37, 38 and the closing portion 90 may be a hollow space.

(6) The present disclosure is not limited to the above-described embodiments, and can be appropriately modified. The above embodiments are not independent of each other, and can be appropriately combined together except when the combination is obviously impossible. Further, in each of the above-mentioned embodiments, it goes without saying that components of the embodiment are not necessarily essential except for a case in which the components are particularly clearly specified as essential components, a case in which the components are clearly considered in principle as essential components, and the like. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Also, the shape, the positional relationship, and the like of the component or the like mentioned in the above embodiments are not limited to those being mentioned unless otherwise specified, limited to the specific shape, positional relationship, and the like in principle, or the like.

(Conclusion)

According to a first aspect described in some or all of the above-described first to fourth embodiments and the other embodiments, the heat exchanger includes includes a stacked heat exchange portion. The stacked heat exchange portion defines therein: first fluid flow paths through which a first fluid flows in a first direction, the first fluid flow paths being stacked with each other in a second direction intersecting with the first direction; and second fluid flow paths each of which is defined between adjacent two first fluid flow paths of the first fluid flow paths, a second fluid flowing through the second fluid flow paths in a third direction intersecting with the first direction and the second direction.

The heat exchanger includes a heat exchanger core that has: a distribution portion located on one side of the first fluid flow paths in the first direction and configured to distribute the first fluid to the first fluid flow paths; and a collection portion located on the one side of the first fluid flow paths in the first direction and configured to collect the first fluid from the first fluid flow paths.

The heat exchanger includes an intake tank having an inlet through which the second fluid flows therein and being configured to guide the second fluid toward an inlet of the second fluid flow paths of the heat exchanger core.

The heat exchanger includes a flow limiting portion configured to suppress an inflow of the second fluid from the intake tank into the distribution portion and the collection portion. The flow limiting portion and the intake tank are provided as a single component.

According to a second aspect, in the heat exchanger, the distribution portion and the collection portion collectively form a distribution-collection portion located on the one side of the first fluid flow paths. The distribution portion and the collection portion are offset from each other in the third direction.

According to a third aspect, the flow limiting portion has a first wall portion located on another side of the distribution-collection portion in the first direction and extending in the second direction. The flow limiting portion is configured to suppress an inflow of the second fluid from the intake tank into the distribution-collection portion.

Accordingly, an inflow of the second fluid into the distribution portion and the collection portion can be suppressed by the first wall portion.

According to a fourth aspect, an end portion of the first wall portion facing the stacked heat exchange portion is spaced from the stacked heat exchange portion. Accordingly, an interference of the first wall portion with the stacked heat exchange portion can be avoided.

According to a fifth aspect, the stacked heat exchange portion includes a flow path forming portions aligned in the second direction and defining the first fluid flow paths. The second fluid flow path, in which an outer fin exchanging heat between the first fluid and the second fluid is disposed, is defined between two adjacent flow path forming portions of the flow path forming portions.

The end portion of the first wall portion facing the stacked heat exchange portion has: clearance forming portions aligned in the second direction and spaced from the flow path forming portion; and fin contact portions each of which is located between adjacent two clearance forming portions and is in contact with the fin.

According to this, the clearance between the first wall portion and the stacked heat exchange portion can be made small. Accordingly, an inflow of the second fluid into the cup portion can be further suppressed.

According to a sixth aspect, the heat exchanger includes a holding portion that holds an intake tank and surrounds the distribution-collection portion and one end of the heat exchanger core in the third direction. The one end in the third direction is an upstream end in a flow direction of the second fluid.

A first end portion of the first wall portion on one side in the second direction is spaced from the holding portion, and a second end portion of the first wall portion on another side in the second direction is spaced from the holding portion.

According to a seventh aspect, the flow limiting portion includes: a second wall portion located on the one side in the third direction with respect to the distribution-collection portion and extending from the first end portion of the first wall portion in the first direction; and a third wall portion located on the one side in the third direction with respect to the distribution-collection portion and extending from the second end portion of the first wall portion in the first direction.

Accordingly, an inflow of the second fluid into the cup portion through a clearance between the first end portion of the first wall portion and the holding portion can be suppressed, and an inflow of the second fluid into the cup portion through a clearance between the second end portion of the first wall portion and the holding portion can be suppressed.

According to an eighth aspect, the flow limiting portion includes a closing portion that closes a space in the distribution-collection portion surrounded by the first wall portion, the second wall portion, and the third wall portion.

What is claimed is:

1. A heat exchanger for exchanging heat between a first fluid and a second fluid, the heat exchanger comprising:
a heat exchanger core including
a stacked heat exchange portion that defines therein
a plurality of first fluid flow paths through which the first fluid flows in a first direction, the plurality of first fluid flow paths being aligned in a second direction intersecting with the first direction, and
a plurality of second fluid flow paths through which the second fluid flows in a third direction intersecting with the first direction and the second direction, each of the plurality of second fluid flow paths being defined between adjacent two first fluid flow paths of the plurality of first fluid flow paths,
a distribution portion located on a first side of the plurality of the first fluid flow paths in the first direction, the distribution portion being configured to distribute the first fluid to the plurality of first fluid flow paths, and
a collection portion located on the first side of the plurality of the first fluid flow paths in the first direction, the collection portion being configured to collect the first fluid from the plurality of first fluid flow paths;
an intake tank that has an inlet through which the second fluid flows therein and is configured to guide the second fluid toward inlets of the plurality of second fluid flow paths of the heat exchanger core; and
a flow limiting portion configured to suppress an inflow of the second fluid from the intake tank into the distribution portion and the collection portion, wherein
the flow limiting portion and the intake tank are provided as a single component,
a part of the heat exchanger core including the distribution portion and the collection portion collectively is a distribution-collection portion located on the first side of the plurality of first fluid flow paths in the first direction, and
the distribution portion and the collection portion are offset from each other in the third direction,
the heat exchanger further comprises:
a frame fixed to a side of the heat exchanger core on which the inlets of the plurality of second fluid flow paths are defined, the frame having a groove portion that surrounds the stacked heat exchange portion and the distribution-collection portion; and
a packing disposed in the groove portion, wherein
the frame is engaged with the intake tank by crimping the frame, thereby the frame holds the intake tank, and
the packing is elastically compressed between the intake tank and the frame to seal a gap between the intake tank and the frame;
wherein:
the flow limiting portion includes a first wall portion located on a second side in the first direction with respect to the distribution-collection portion;
the first wall portion extends in the second direction to suppress an inflow of the second fluid into the distribution-collection portion from the intake tank;
the heat exchanger further comprises a holding portion located on one side in the third direction with respect to the heat exchanger core, the one side in the third direction being an upstream side in a flow direction of the second fluid;
the holding portion surrounds the stacked heat exchange portion and the distribution-collection portion;
the holding portion is held by the heat exchanger core and holds the intake tank, a first end portion of the first wall portion on one side in the second direction is spaced from the holding portion;

a second end portion of the first wall portion on another side in the second direction is spaced from the holding portion; and the flow limiting portion includes a second wall portion located on the one side in the third direction with respect to the distribution-collection portion and extending from the first end portion of the first wall portion in the first direction, and a third wall portion located on the one side in the third direction with respect to the distribution-collection portion and extending from the second end portion of the first wall portion in the first direction.

2. A heat exchanger for exchanging heat between a first fluid and a second fluid, the heat exchanger comprising:

a heat exchanger core including a stacked heat exchange portion that defines therein a plurality of first fluid flow paths through which the first fluid flows in a first direction, the plurality of first fluid flow paths being aligned in a second direction intersecting with the first direction, and a plurality of second fluid flow paths through which the second fluid flows in a third direction intersecting with the first direction and the second direction, each of the plurality of second fluid flow paths being defined between adjacent two first fluid flow paths of the plurality of first fluid flow paths, a distribution portion located on a first side of the plurality of the first fluid flow paths in the first direction, the distribution portion being configured to distribute the first fluid to the plurality of first fluid flow paths, and a collection portion located on the first side of the plurality of the first fluid flow paths in the first direction, the collection portion being configured to collect the first fluid from the plurality of first fluid flow paths;

an intake tank that has an inlet through which the second fluid flows therein and is configured to guide the second fluid toward inlets of the plurality of second fluid flow paths of the heat exchanger core; and a flow limiting portion configured to suppress an inflow of the second fluid from the intake tank into the distribution portion and the collection portion, wherein the flow limiting portion and the intake tank are provided as a single component, a part of the heat exchanger core including the distribution portion and the collection portion collectively is a distribution-collection portion located on the first side of the plurality of first fluid flow paths in the first direction, the distribution portion and the collection portion are offset from each other in the third direction, the flow limiting portion includes a first wall portion located on a second side in the first direction with respect to the distribution-collection portion, the first wall portion extends in the second direction to suppress an inflow of the second fluid into the distribution-collection portion from the intake tank, the heat exchanger further comprises:

a holding portion located on one side in the third direction with respect to the heat exchanger core, the one side in the third direction being an upstream side in a flow direction of the second fluid, wherein the holding portion surrounds the stacked heat exchange portion and the distribution-collection portion, the holding portion is held by the heat exchanger core and holds the intake tank, a first end portion of the first wall portion on one side in the second direction is spaced from the holding portion, and a second end portion of the first wall portion on another side in the second direction is spaced from the holding portion, and the flow limiting portion includes a second wall portion located on the one side in the third direction with respect to the distribution-collection portion and extending from the first end portion of the first wall portion in the first direction, and a third wall portion located on the one side in the third direction with respect to the distribution-collection portion and extending from the second end portion of the first wall portion in the first direction.

3. The heat exchanger according to claim 1, wherein an end of the first wall portion facing the stacked heat exchange portion is spaced from the stacked heat exchange portion.

* * * * *